US010846107B2

(12) United States Patent
Jarabek et al.

(10) Patent No.: US 10,846,107 B2
(45) Date of Patent: Nov. 24, 2020

(54) MULTI-WINDOW ARCHITECTURE AND DATA COMMUNICATION FOR A REMOTE ACCESS APPLICATION SESSION

(71) Applicant: Calgary Scientific Inc., Calgary (CA)

(72) Inventors: Christopher James Jarabek, Calgary (CA); Kevin Glen Robinson, Calgary (CA); Kevin James Bradley, Calgary (CA); Monique Michele Kawa, Calgary (CA); Nicolas Eduardo Valera, Calgary (CA); Cole Sawyer Franz, Calgary (CA)

(73) Assignee: CALGARY SCIENTIFIC INC., Calgary (CA)

( * ) Notice: Subject to any disclaimer, the term of this patent is extended or adjusted under 35 U.S.C. 154(b) by 276 days.

(21) Appl. No.: 15/465,293

(22) Filed: Mar. 21, 2017

(65) Prior Publication Data

US 2018/0121217 A1  May 3, 2018

Related U.S. Application Data

(60) Provisional application No. 62/414,522, filed on Oct. 28, 2016.

(51) Int. Cl.
*G06F 9/451* (2018.01)
*G06F 9/54* (2006.01)
(Continued)

(52) U.S. Cl.
CPC ............. *G06F 9/452* (2018.02); *G06F 9/546* (2013.01); *H04L 51/18* (2013.01);
(Continued)

(58) Field of Classification Search
CPC .................................................. G06F 21/606
(Continued)

(56) References Cited

U.S. PATENT DOCUMENTS 5,923,307 A  7/1999  Hogle
7,161,557 B2  1/2007  Thornton
(Continued)

FOREIGN PATENT DOCUMENTS

WO  2015/017491  2/2015

OTHER PUBLICATIONS

JSDoc: MultiWndow, pureweb.io, retrieved on Mar. 15, 2017 from http://docs.pureweb.io/API4.2/HTML5/pureweb.client.MultiWindow.html, 2017, 4 pages.
(Continued)

*Primary Examiner* — Cao H Nguyen
(74) *Attorney, Agent, or Firm* — Meunier Carlin & Curfman LLC

(57) ABSTRACT

Disclosed herein are methods and systems that provide for session storage in a remote access environment where a service application is remotely access by a client application. Session storage is in-memory, private local data store that uses key/value pairs to associate data with a particular session where data in the private local data store associated with the particular session is synchronized with the service application using a protocol over HTTP/S and WS/S. Also disclosed herein is an inter-widow communication mechanism that provides for a multi-window architecture where interconnected windows of a client application concurrently display information. This can be extended to use the private local data store, which enables the display and synchronization of content from a remote service application on a client device in a multi-window architecture.

39 Claims, 32 Drawing Sheets

(51) Int. Cl.
  *H04L 12/58* (2006.01)
  *H04L 29/06* (2006.01)
  *G06F 9/455* (2018.01)
  *H04L 12/18* (2006.01)
  *H04L 29/08* (2006.01)

(52) U.S. Cl.
  CPC .............. *H04L 65/4007* (2013.01); *G06F 2009/45595* (2013.01); *H04L 12/1813* (2013.01); *H04L 67/10* (2013.01)

(58) Field of Classification Search
  USPC .............................. 715/751–752, 780, 740
  See application file for complete search history.

(56) References Cited

U.S. PATENT DOCUMENTS

| | | |
|---|---|---|
| 7,636,899 B2 | 12/2009 | Purcell et al. |
| 8,234,315 B2 * | 7/2012 | Arthursson ......... G06F 9/45504 707/810 |
| 8,471,781 B2 | 6/2013 | Massand |
| 8,963,796 B2 | 2/2015 | Siddiqui et al. |
| 9,135,052 B2 * | 9/2015 | Luxenberg .......... G06F 9/45558 |
| 2007/0197909 A1 | 8/2007 | Kariathungal et al. |
| 2011/0063191 A1 | 3/2011 | Leung et al. |
| 2011/0302316 A1 * | 12/2011 | Chou ..................... H04L 67/14 709/228 |
| 2013/0311889 A1 | 11/2013 | Davis |
| 2014/0033067 A1 * | 1/2014 | Pittenger ............... G06F 21/606 715/751 |
| 2014/0139402 A1 | 5/2014 | Pavlov et al. |
| 2014/0164940 A1 | 6/2014 | Fisher |
| 2014/0289644 A1 * | 9/2014 | Clarke ................... H04L 51/34 715/752 |
| 2014/0380201 A1 | 12/2014 | Massand |
| 2015/0091778 A1 * | 4/2015 | Day ..................... G06F 3/1446 345/1.3 |
| 2015/0346855 A1 * | 12/2015 | Momchilov ........... G06F 3/038 345/173 |
| 2016/0191635 A1 * | 6/2016 | Greenan ................ H04L 67/16 709/219 |
| 2016/0359684 A1 * | 12/2016 | Rizqi .................... G06F 3/0659 |
| 2017/0134385 A1 * | 5/2017 | Mitevski ............. H04L 63/0815 |

OTHER PUBLICATIONS

Multiple Windows, PureWeb® 4.2 Documentation, retrieved on Mar. 15, 2017 from file://calgaryscientific.local/shared/Departments/technical writers/published/pureweb/4.2/SDK4.2/content/enhance/multiple windows.html, 2017, 4 pages.

* cited by examiner

US 10,846,107 B2

MULTI-WINDOW ARCHITECTURE AND DATA COMMUNICATION FOR A REMOTE ACCESS APPLICATION SESSION

CROSS-REFERENCE TO RELATED APPLICATION

This application claims priority to U.S. Provisional Patent Application No. 62/414,522, filed Oct. 28, 2016, entitled "MULTI-WINDOW ARCHITECTURE AND DATA COMMUNICATION FOR A REMOTE ACCESS APPLICATION SESSION," which is incorporated herein by reference in its entirety.

BACKGROUND

Remote access frameworks enable remote clients to access applications and data over a network connection. To create such frameworks, service APIs may stream rendered graphics from the service application and expose the service's functionality to remote clients. The remote clients provide a native web or mobile interface for the end users (e.g., HTML5, iOS, or Android). Client APIs access the functionality exposed by the service and display the streamed graphics. It is sometimes desirable to display multiple windows of an application, for example, to display a variety of medical images on a multiple monitor workstation. To provide for multiple layouts in single display or to fully utilize a dual monitor display, separate remote clients are executed on the same remote device with a single window for each connection to the service application. This is difficult to achieve because the separate remote clients need to be synchronized by the remote access server to give the appearance to a user that they are working together and limits the ability to interact independently with the displays when desired. Further, the display layout may be limited to a pre-configured rule therefore limited to particular use cases.

SUMMARY

Disclosed herein are methods and apparatuses for providing a multi-window architecture. In accordance with the present disclosure, the method includes establishing a session between a service application and a client application; displaying a parent window in the client application executing on a computing device, the parent window executing a first webclient having first message handlers; displaying a child window in the client application, the child window executing a second webclient having second message handlers; executing a binary proxy in the parent window that proxies communications between the child window and the service application; synchronizing an application state between the parent window, the child window and the service application using a state model that includes information associated with the service application; and communicating messages between the parent window and the child window in the client application using a message bus that is a local communication mechanism within the client application for messages between the parent window and the child window.

Also disclosed herein are methods and systems that provide for session storage in a remote access environment where a service application is remotely access by a client application. Session storage is in-memory, private local data store that uses key/value pairs to associate data with a particular session where data in the private local data store associated with the particular session is synchronized with the service application using a protocol over HTTP/S and WS/S. Also disclosed herein is an inter-widow communication mechanism that provides for a multi-window architecture where interconnected windows of a client application concurrently display information. This can be extended to use the private local data store, which enables the display and synchronization of content from a remote service application on a client device in a multi-window architecture.

Yet another method for providing a multi-window architecture includes providing a parent window in a client application executing on a computing device, the parent window executing a first webclient having first message handlers; providing a child window in the client application, the child window executing a second webclient having second message handlers; and messaging data between the parent window and the child window in the client application using the first message handlers and the second message handlers A further method for providing a multi-window architecture includes establishing a session between a service application and a client application; displaying a parent window in the client application executing on a computing device, the parent window executing a first webclient having first message handlers; displaying a child window in the client application, the child window executing a second webclient having second message handlers; executing a binary proxy in the parent window that proxies communications between the child window and the service application; synchronizing an application state between the parent window, the child window and the service application using a state model that includes information associated with the service application; maintaining a view registry at the parent window that is used by the child window when child views are created and registered; and determining, using the view registry, if an update received at the parent application from the service application or a second child window needs to be communicated to a respective child view.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms.

In accordance with aspects of the present disclosure, an inter-widow communication mechanism is described that utilizes an in-memory data structure to communicate information between the windows. The communication mechanism enables, for example, the display of content from a remote service application on a client device in a multi-window architecture. The communication mechanisms described herein allows users to see several views of the client at once, and to interact with each one separately, as well as to permit collaboration of a client with other clients. This feature can be used to build a multi-monitor solution, since each browser window can be displayed on a different monitor. Further, the present disclosure supports multi-window, multi-monitor views with minimal updating of existing client application code.

Example Environment

Figure 1:
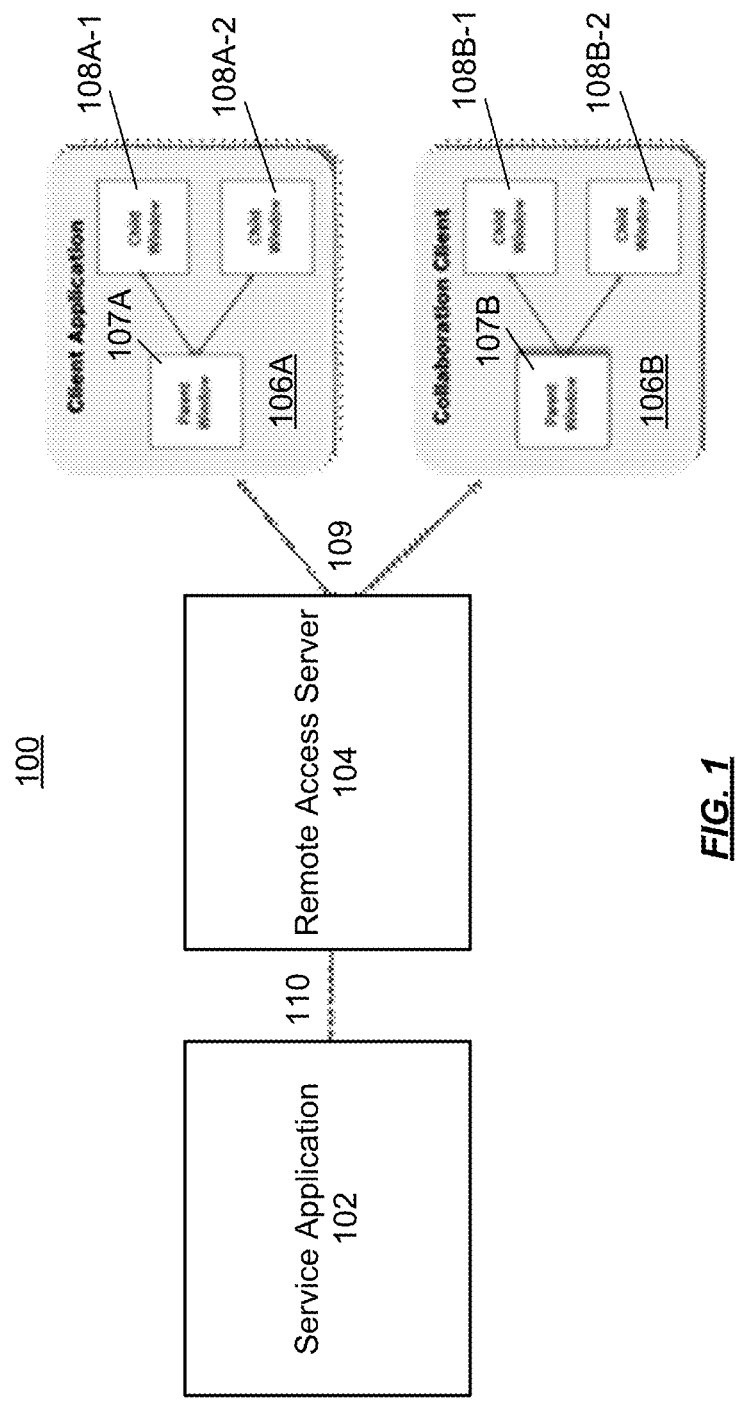
FIG. 1 illustrates an example environment for providing remote access to a service application using an inter-window communication mechanism of the present disclosure that enables multi-window, multi-monitor view of the service application.

With reference to FIG. 1, there is illustrated an example environment 100 for providing remote access to a service application in which the inter-window communication mechanism of the present disclosure may be used to provide multi-window, multi-monitor views of the service application. The environment 100 generally consists of three components: at least one service application(s) 102, a remote access server 104, and a client application 106A that each execute on respective client devices (not shown). Optionally or additionally, one or more collaborator client application(s) 106B may collaborate with the at least one service application(s) 102 and the client application 106A. The remote access server 104 and service application(s) 102 may be executed on the same physical computing device (e.g., a server computer) or may each execute on their own respective computing devices. Each may be deployed to a private or public cloud. The client devices may be a computing device such as a desktop computing device, laptop/notebook, a mobile computing device, smartphone, tablet, etc.

The service application(s) 102 is an application that has been extended using service APIs (not shown) to connect it to the remote access server 104. The service APIs provide a number of features to the service application(s) 102, including, but not limited to, an image remoting pipeline, synchronized event-based state management using application state, command-response APIs, tools for collaboration, and a synchronized data store using session storage. The service application(s) 102 can be accessed by the client application 106A and the one or more collaboration client application(s) 106B, which may be, e.g., an HTML5 compatible web browsers or native applications on mobile devices (e.g., IOS, ANDROID) and/or desktop computers over communications networks 109 and 110. The networks 109 and 110 may be any type of network, for example, the TCP/IP networks (e.g., the Internet), Wi-Fi (IEEE 802.11x), Ethernet, 3G, 4G, LTE, etc.

The remote access server 104 brokers communications between the client application 106A, the one or more collaboration client application(s) 106B and the service application(s) 102. The remote access server 104 provides features such as managing sessions, marshalling connections from clients, and launching application instances. The remote access server 104 manages collaborative sessions, which allows two or more users to view and interact with the same service application(s) 102 using independent client applications (e.g., 106A and 106B). An example of the remote access server 104 is PUREWEB, available from Calgary Scientific, Inc., Calgary, Alberta, Canada.

In the environment 100, each client application 106A and 106B may display information associated with the service application(s) 102 in a parent window 107A and 107B, respectively. In particular, when the multi-window, multi-monitor view of the service application(s) 102 is configured, a parent-child window paradigm may be used where each parent window 107A and 107B may have one or more child windows 108A-1/108A-2 and 108B-1/108B-2 associated therewith, that also display information associated with the service application(s) 102 using the intra-window communication mechanism described below and/or synchronization of application state, as described below. Further, in accordance with the present disclosure, the multi-window, multi-monitor views are provided with minimal updating of existing client application code.

For example, the parent window 107A of the client application 106A connects to the service application 102. Subsequently, the parent window 107A may be used to launch one or more of the child windows 108A-1 and 108A-2 by calling an API to create a new child window. The above creates a parent-child relationship between the first window launched, i.e., the parent window 107A, and each subsequent instance, i.e., the child windows 108A-1, 108A-2. This may have a few implications. For example, terminating the parent window 107A terminates the child window(s) 108A-1, 108A-2. Further, the child window(s) 108A-1, 108A-2 cannot create other child windows. A child window 108A-1, 108A-2 cannot reconnect after disconnecting. If a child window disconnects, it is closed and a new one is launched from the parent 107A. According to an aspect of the present disclosure, the child window(s) 108A-1, 108A-2 may be displayed on a first and second monitor of a computing device. To accomplish this, a user may drag and drop, e.g., child window 108A-2 from the first monitor to the second monitor. Additional details of the present disclosure that provide for the multi-window, multi-monitor view of the service application(s) 102 will now be described.

Data Storage and Synchronization in the Environment 100

I. Session Storage

Figure 2:
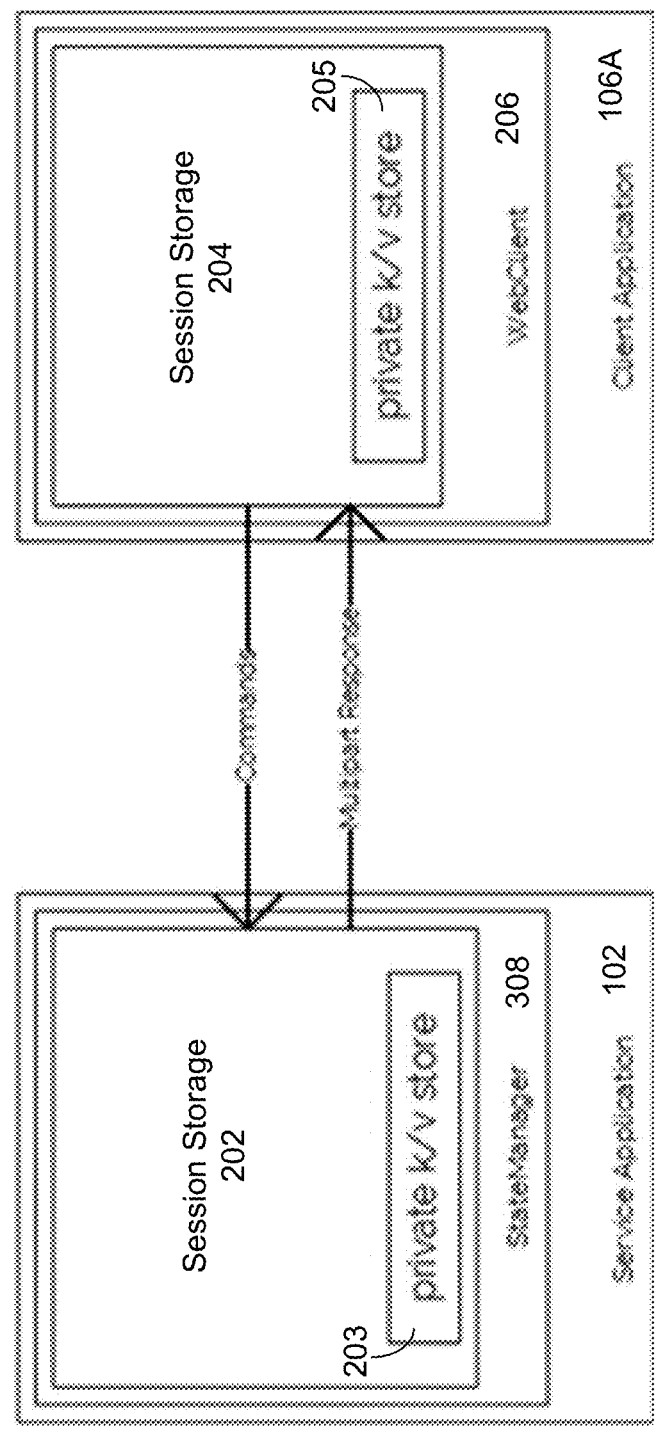
FIG. 2 illustrates the service application and a client application each utilizing session storage in the environment of FIG. 1.

With reference to FIG. 2, there is illustrated the service application 102 and the client application 106A (or 106B) having session storage 202 and session storage 204, respectively. Herein, generally, "session storage" is in-memory, private local data store that uses key/value pairs to associate data with a particular session where data in the private local data store associated with the particular session is synchronized with the service application 102 using a protocol over HTTP/S and WS/S. Data in session storage is stored as map using the key/value pairs. For example, session storage data may have a flat structure.

As a specific example, when the client application 106A is executed on a computing device, JavaScript may be executed to create the session storage 204, which creates an in-memory private key/value local data store 205. Once a session is established between the client application 106A and the service application 202, a corresponding in-memory, private key/value local data store 203 is created at the service application 102 to synchronize certain data therebetween. The key/value local data stores 203 and 205 exist on the basis of the existence of the session between the service application 102 and the client application 106A. In other words, the key/value local data stores 203 and 205 are specific to a session. All instances of a client with the same session ID (e.g., the parent window 107A and any child windows 108A-1 and/or 108A-1) will see same content, while windows with different session IDs (e.g., separate collaborating client application 106B) will see only the content of their data store. However, to enable all clients to see selected data within session storage, an API may be used for this purpose. When the session between the service application 102 and the client application 106A ends, the key/value local data store 203 is destroyed. The key/value local data store 205 remains until the client application 106A navigates away from the Uniform Resource Locator (URL) associated with the session.

Thus, session storage makes it possible to make different data available to different client applications connected to the same service application 102. This can prove especially useful in collaboration scenarios, as it provides a means to ensure that collaboration participants do not gain access to sensitive data (e.g., patient metadata) intended only for the session host. Further, the service application 102 is unware that the HTML5 client browser or native app (i.e., client application 106A) is participating in the multi-window, multi-monitor environment of the present disclosure.

Figure 3:
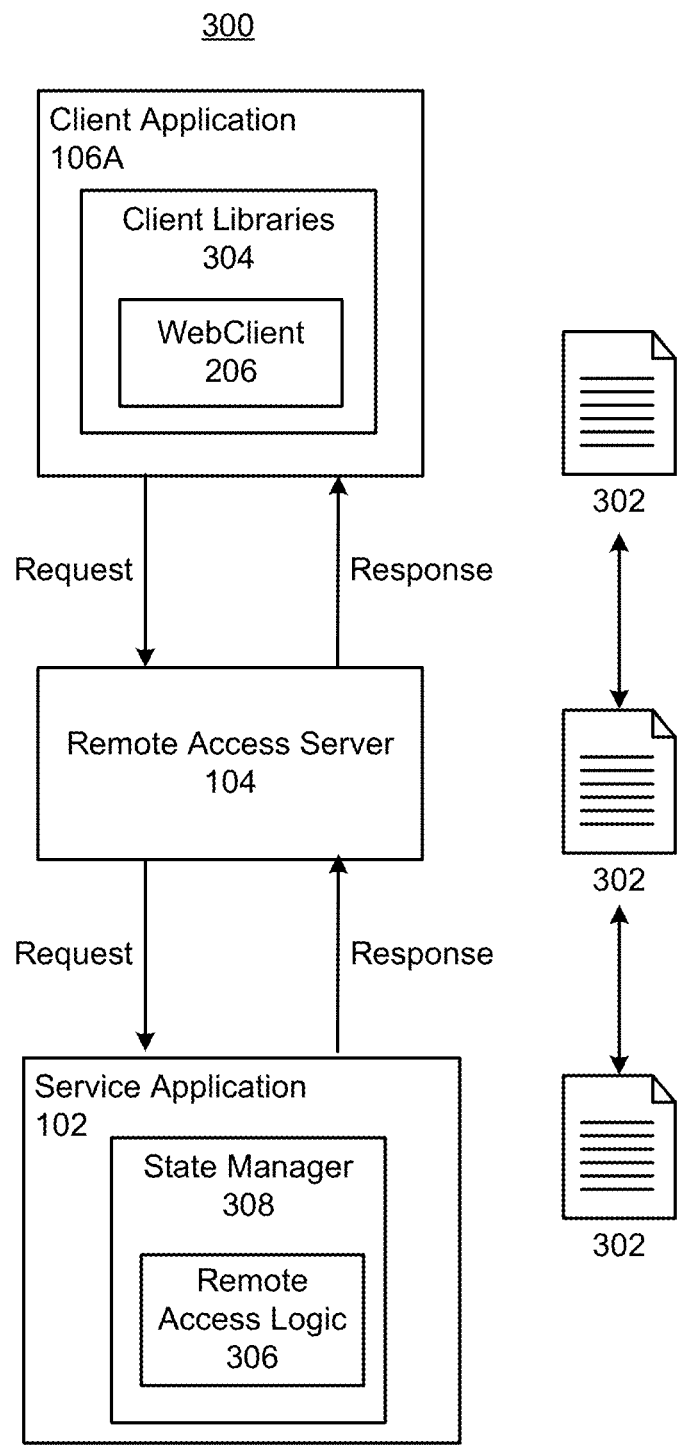
FIG. 3 illustrates additional remote access components of the environment of FIG. 1 that provide for synchronization of application state information that is available to all participants in a session.

In the service application 102, the session storage 202 executes within a state manager 308, which is described below with respect to FIG. 3. In the client application 106A, the session storage 204 executes within a WebClient 206, which is an application component that communicates with the service application 102 using Hypertext Transfer Protocol (HTTP and/or HTTPS) or a websocket (WS/S) connection. The WebClient 206 may be generally understood as being responsible for the communication of information to and from the client application 106A.

In operation, the key/value local data stores 203 and 205 may be used as follows. Commands sent by the client application 106A are received by the service application 102, which writes data into its local data store 203, and invokes a multipart response that is communicated back to the client application 106A. On the service application 102, an API may be used to write a key/value pair to session storage 203. A sessionId may be used as a parameter for service-side methods to specify to which client a data store operation applies. As noted above, a service-only method, can be used to write an entry in the key/value data stores for all clients connected to the same service application 102, thereby making the entry present in the local data store (session storage) of every participant in a collaboration setting, if necessary. Further details of the use of session storage during an active session between the client application 106A and the service application 102 is described with reference to FIGS. 5, 6E and 7D.

Session storage provides for a straightforward method of synchronizing information between the client application 106A and the service application 102. In particular, a simple "all or nothing" strategy may be used to update data contained in session storage wherein updates may be performed by taking a string in session storage and replacing it with another string. A replacement operation is always a fast operation, regardless of how large the string is. For example, if the update is to a small value in session storage, such as changing a value of x=3 to x=4, only a single character update is needed, which is fast to transmit, fast to compare, and fast to update. In another example, if a single value in a large string is to be updated (e.g., a 10,000 character session storage value), then all 10,000 characters are sent to session storage to perform the update.

Session storage may have a string only format which can be formatted to add any string (e.g., a JSON string, a YML string, an XML string, etc.). This way it is possible to create an environment 100 where each HTML5 client browser instance is as unaware as possible that it is participating in multi-monitor session, as coordination and state management is strictly controlled by the remote access server 104. Session storage may also be used to provide a dictionary where contents are shared. It can generate client-side and service-side events when values in the dictionary change. The values of the dictionary may support, e.g., the extended range of Unicode characters such as emoji's. Clients may request updates to the dictionary, and they will receive updates from the service application 102 using a custom multipart handler.

According to an aspect of the present disclosure, to provide for consistency across the environment 100, the service application 102 maintains a map of all private key/value data stores, e.g., the key/value local data store 203 associated with each client application 106A and others (not shown) associated with the one or more collaboration client application(s) 106B. Thus, the session storage 202 of the service application 102 always maintains the canonical value of the data within the respective private key/value data stores (i.e., the service application 102 holds the truth with respect to a values in session storage).

II. Application State/State Model

Session storage may be used to convey and synchronize information that is desired to be private to a session. FIG. 3 illustrates additional remote access components 300 of the environment 100 that provide for synchronization of application state. Application state is a mechanism for synchronizing string data across clients in a session. The WebClient 206 of FIG. 2 may reside within client libraries 304 in the client application 106A. The client libraries 304 may be specific or independent of the platform of the client computing device associated with the client application 106A. The remote access server 104 communicates to a state manager 308 residing within the service application(s) 102 and remote access logic 306. The state manager 308 registers views and event handlers to communicate application state information within a state model 302. The remote access logic 306 enables the service application 102 to communicate with the remote access server 104.

The state model 302 is an abstraction in which application state is communicated. The state model 302 may comprise, for example, an association of logical elements within a view of the service application 102 with corresponding states of the service application 102. The state model 302 may be modified by the client application 106A or the service application 102 to update information contained therein and to synchronize the information therebetween.

Multi-Window Architecture in the Environment 100

Figure 4A:
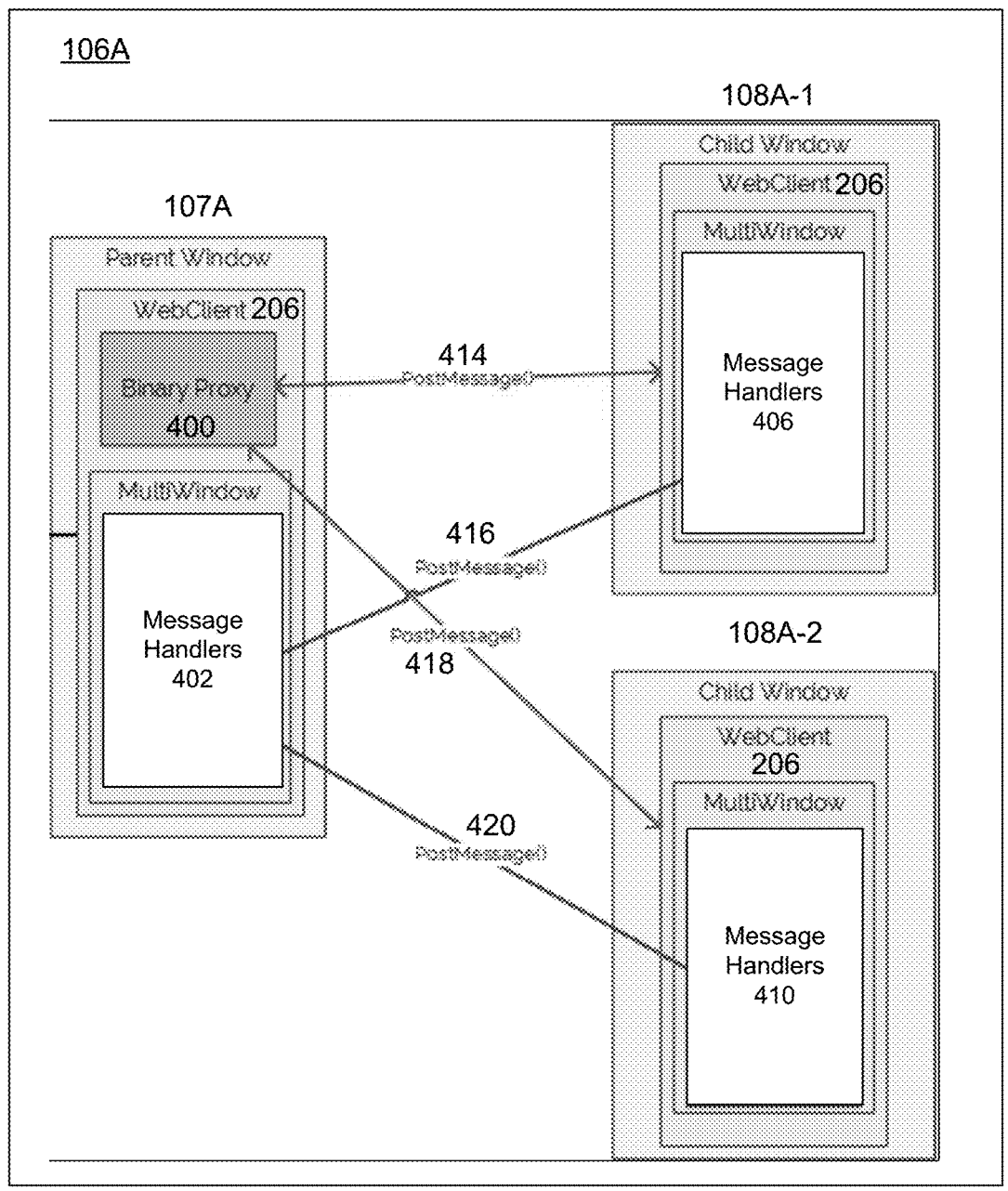
FIG. 4A illustrates an example multi-window architecture in the environment of FIG. 1.

Referring now to FIG. 4A, there is illustrated aspects of a multi-monitor architecture that includes the parent window 107A and the child window(s) 108A-1, 108A-2 of the client application 106A. In the client application 106A, postMessage may be used as a messaging mechanism between windows. PostMessage allows ArrayBuffers to be passed as transferable objects and may be used to proxy messages. As such, in the client application 106A, a large block of binary data can be passed between windows with very low (e.g., <1 ms latency). However, if the client application 106A is not able to communicate binary data using PostMessage (e.g., certain variants of INTERNET EXPLORER), binary data is converted to string data and then communicated from a source window to a destination window in such client applications 106A. After receipt at the destination window, the string data is converted back to binary data. In some implementations, the string data may be server-side encoded at service application 102 (not shown in FIG. 4A).

In accordance with the present disclosure, communications may be passed between the parent window 107A, and the child window(s) 108A-1, 108A-2 using, e.g., postMessage and Message Handlers 402, 406 and 410 that communicate messages between the windows. The messages may originate in one window and are communicated to the other windows in a multi-window architecture. An API may be provided to send messages to from one window to another window and, optionally, trigger a response in the destination window through event handling. This may also be used to broadcast a message to all windows at once. To send a message, the destination window may be specified as a unique identifier. In some instances, if no destination is specified, the message will be broadcast to all open windows, except the window from which the message originates.

Optionally, proxied messages may communicated using postMessage, where the proxied messages are passed between a child window 108A-1, 108A-2 and external component of the client application 106A (e.g., the service application 102), using the parent window 107A as a proxy. To accomplish this, the parent window 107A may include a binary proxy 400 that proxies all communications between the child window(s) 108A-1, 108A-2 and the external component. The parent window 107A does not inspect the message it proxies.

Further optionally, the parent window 107A may pass flow control to one of the child window(s) 108A-1, 108A-2. This enables a slow responding child window to update sequence ID messages, which effectively slows the rate at which the service application 102 sends updates to the client application 106A. This has the effect of reducing the lag time at which a child window updates with respect to its parent window.

Event Handling

As noted above, whenever a parent window or child window sends a message, an event may be raised. A handler can be chained to this event on the destination window, so that it can respond appropriately to the message. For example, a message labeled "exit" may be sent by a sending window, and a corresponding event handler in the destination window closes the destination window on receiving this message.

Multi-Window Architecture with Data Synchronization in the Environment 100

Figure 4B:
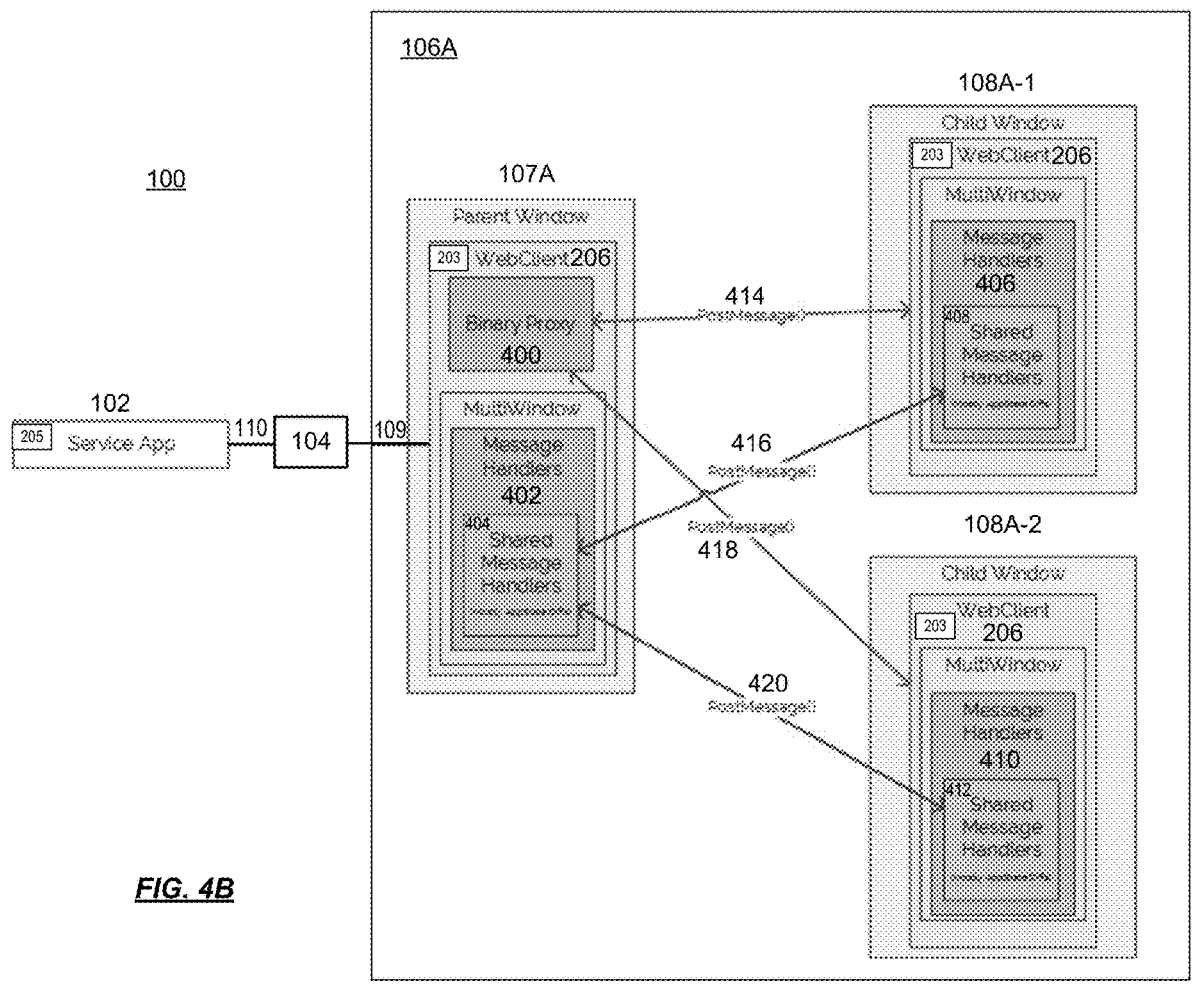
FIG. 4B illustrates another example multi-window architecture in the environment of FIG. 1 with further implementation details.

Referring now to FIG. 4B, there is illustrated aspects of the example messaging mechanism of FIG. 4A that may be used to synchronize state data between the service application 102, the parent window 107A, and the child window(s) 108A-1, 108A-2 using application state in the environment 100. In particular, as shown in FIG. 4B, the messaging mechanism of FIG. 4A may be used to communicate state model information between the parent window 107A and the child window(s) 108A-1, 108A-2.

In accordance with the present disclosure, two types of communications may be passed between the parent window 107A, and the child window(s) 108A-1, 108A-2 using, e.g., postMessage to provide for data synchronization with the service application 102, as follows:

Proxied Messages

Proxied messages are messages that are passed between a child window 108A-1, 108A-2 and the service application 102) using the binary proxy 400 of the parent window 107A. The parent window 107A proxies all communications between the child window(s) 108A-1, 108A-2 and the service application 102. As noted above, the binary proxy 400 does not inspect the message it proxies.

Shared Messages

The parent window 107A, and the child window(s) 108A-1, 108A-2 each include Message Handlers 402 that communicate shared messages between the windows using shared message handlers 404, 408 and 412. Shared messages are messages that originate in one window that are communicated to the other windows in a multi-monitor session. This allows the windows in a multi-monitor session to look and behave as though they were a single cohesive client application.

As in FIG. 4A, an API may be provided in the environment of FIG. 4B to send messages to from one window to another window and trigger a response in the destination window through event handling.

As shown in FIG. 4B, the communication between the parent window 107A and the service application 102 over the networks 109 and 110 may be performed using a websocket or the HTTP request/response protocol and may be viewed as be a single communication channel. The child window(s) 108A-1, 108A-2 are treated as an extension of the parent window 107A and utilize the parent window's communication channel with the service application 102. As such, the service application 102 will see all windows 107A, 108A-1, and 108A-2 as belonging to a single client application 106A. The use of a single communication channel has an additional benefit of reducing the overall network bandwidth consumed in a multi-window environment as it provides a high performance messaging mechanism.

In FIG. 4B, communication between the service application 102, the remote access server 104 and the client application 106A, 106B is performed over a websocket using the same ArrayBuffer format described above. Thus, data communicated over the websocket can be duplicated and passed to each of the child windows 108A-1, 108A-2. Similarly, any commands that a child window 108A-1, 108A-packages into an ArrayBuffer and sends on PostMessage may be communicated directly onto the websocket without alteration. The above makes for a very high performance messaging mechanism. This messaging mechanism isolates changes needed for implementation to the client libraries 304 and requires no changes to the service application 102 or the remote access server 104.

An example use of the shared messaging described above is to communicate changes to application state from the child window(s) 108A-1, 108A-2 to the parent window 107A. For example, if an action is performed in the child window 108A-1 that generates an application state change to the state model 302, a postMessage communication 414 containing the change may be communicated from the child window 108A-1 to the parent window 107A, which consumes and integrates information in the state model 302. In a subsequent communication, the child window 108A-1 may communicate the change to the parent window 107A for forwarding by the binary proxy 400 to the service application 102. If an action is performed in the child window 108A-2 that generates an application state change to the state model 302, a postMessage communication 416 containing the change may be communicated from the child window 108A-2 to the parent window 107A, which consumes and integrates information in the state model 302. In a subsequent communication, the child window 108A-2 may communicate the change to the parent window 107A for forwarding by the binary proxy 400 to the service application 102. If an action is performed in the parent window 107A that generates an application state change to the state model 302, a postMessage communication 416 containing the change may be communicated from the parent window 107A to the child windows 108A-1 and 108A-2, which consume and integrate information in the state model 302. In a subsequent communication, the parent window 107A may communicate the change to the service application 102. In each instance above, the service application 102 will be informed of this change over the websocket connection.

To update the child window(s) 108A-1, 108A-2 of the result of the application state change caused by the other of the child window(s) 108A-2, 108A-1, respectively, the response received by the binary proxy 400 and the parent window 107A may be sent to the child window(s) 108A-1, 108A-2 as a postMessage communication 418, 420, respectively. All changes initiated within a child window are reflected by the parent window 107A to the other children windows. This insures that all 'sibling' windows are kept in sync. Examples of the above are shown in user interfaces of FIGS. 13-19.

Figure 4C:
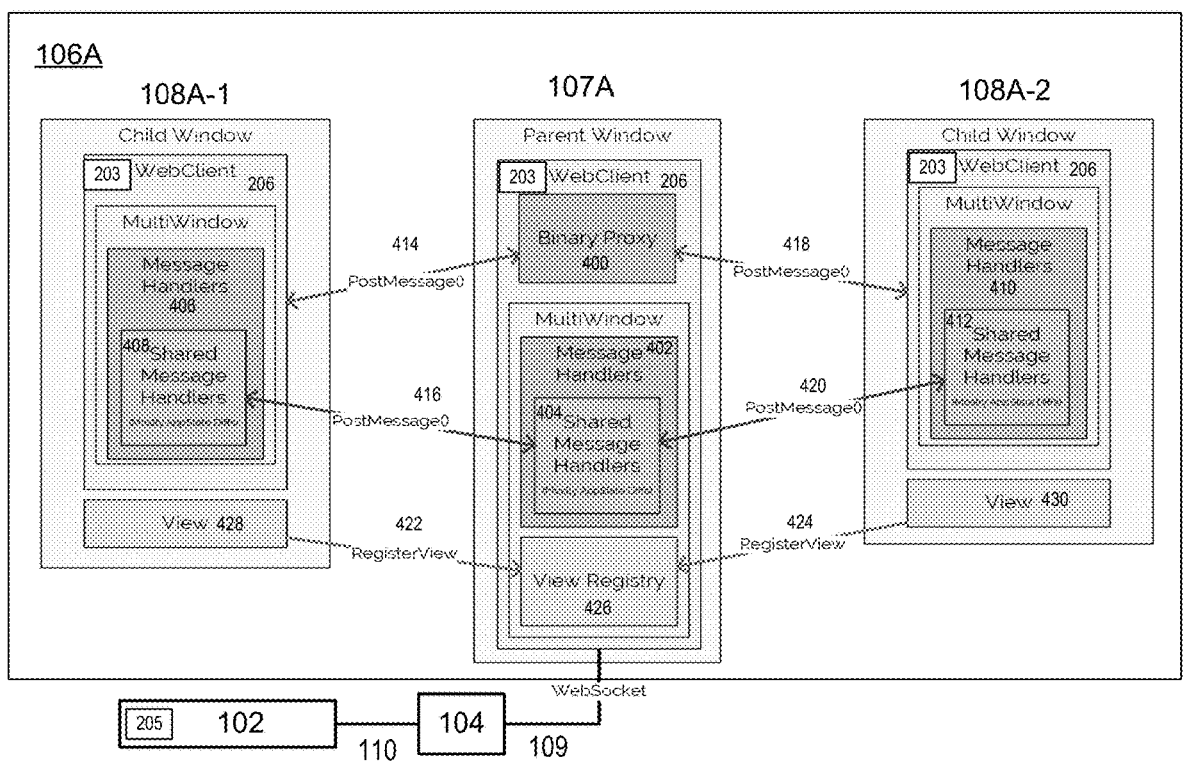
FIG. 4C illustrates yet another example multi-window architecture in the environment of FIG. 1.

FIG. 4C illustrates other aspects of the example messaging mechanism that may be used to synchronize state data and views between the service application 102, the parent window 107A, and the child window(s) 108A-1, 108A-2 using application state in the environment 100. In particular, additionally or alternatively to that shown in FIG. 4B, a view registry 426 is provided at the parent window 107A that is used by the child window(s) 108A-1, 108-2 when child views 428, 430 are created and registered (see, FIGS. 5, 6A and 75 at 505). After incoming message headers are received and parsed by the binary proxy 400, the parent window 107A, using the view registry 426, determines what updates need to be communicated to the respective child views 428, 430. To accomplish this, there is a connection (not shown) between the binary proxy 400 and the view registry 426. In this manner, view updates are sent only to the child window(s) that need them, rather than sending the updates to all windows, thus providing a performance benefit. When the child views 428, 430 are destroyed, they are removed from the view registry 426.

Figure 5A:
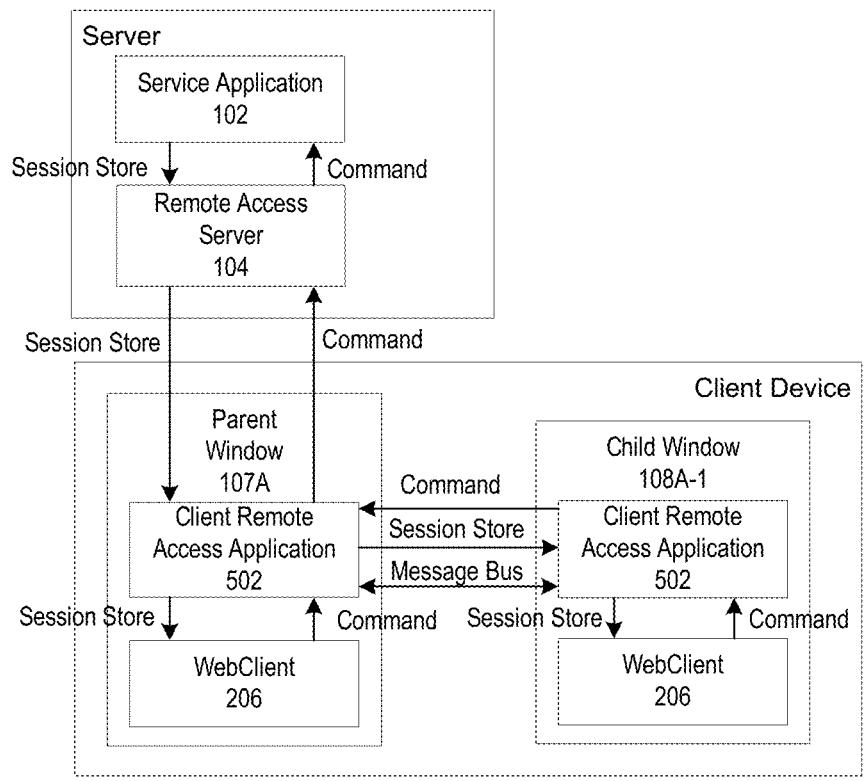
FIGS. 5A-5B show server-parent-child window communication and a message bus in accordance with the present disclosure.
Figure 5B:
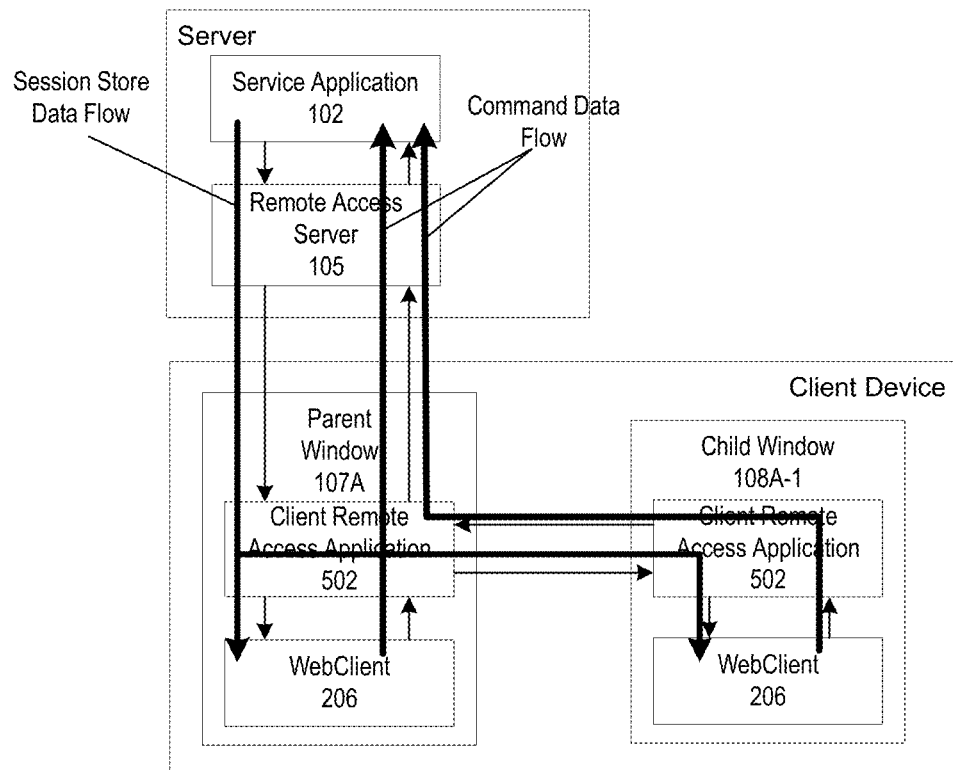

FIGS. 5A and 5B illustrate a server-parent-child window communication in accordance with the present disclosure. When there are multiple windows in a session, only the parent window 107A actually sends commands to the service application 102. When a child window 108A-1 wants to send a command to the service application 102, it has to tell the parent window 107A to send the command in its place. For example, as shown in FIGS. 5A and 5B, the WebClient 206 of the child window 108A-1 sends a command to a client remote access application 502, which sends the command to the client remote access application 502 of the parent window 107A, which forwards it to the remote access server 104, which finally forwards the command to the service application 102.

Similarly, only the parent window 107A receives session storage updates from the service application 102. The parent then takes the session storage update and copies it to the child window 108A-1 in order for the child window 108A-1 to receive the update. Thus, when a session storage update is communicated from the service application 102 to the remote access server 104, it is then forwarded to the remote access application 502 of the parent window 107A, and copied to the client remote access application 502 of the child window 108A-1 so that the WebClient 206 of the child window 108A-1 may be updated. The session storage dataflow shown in FIGS. 5A and 5B utilizes a key/value pair, as noted above.

Message Bus

As shown in FIG. 5A, a messaging bus may be provided as a mechanism that allows the parent widow 107A to communicate with the child window 108A-1 by sending messages between the windows without any involvement of the server remote access server 104 or the service application 102. The message bus may be used for inter-window communication and may use the APIs exposed by the architecture of FIGS. 4A-4C. In particular, the PostMessage function may be used.

An example implementation of the message bus may be achieved by creating a wrapper/interface for the multi window messages (messagingBusManager.js) on the WebClient 206 that handles sending/receiving, parsing out messages, and registering callbacks in a registry. The wrapper/interface does not listen for specific messages, rather it detects that a message has been sent. The wrapper/interface then parses out a specific message of interest and looks for it in a callback lookup table. If a callback has been registered for a specific message, then it is run. If no callback exists, then no action is taken.

The messaging bus may be used in situations where the parent widow 107A and the child window 108A-1 communicate about something that has no relation to the service application 102. It may also be used to mirror a client-side action in one window on another window, where such action does not interact with the service application 102 or does not involve application state. An example of this is closing a study panel in the user interface (see, FIGS. 12-20). A user interface update is something that the service application 102 has no knowledge of, and therefore would not notify other client devices of such an action.

Example Operational Flow of a Multi-Window Architecture

Figure 6:
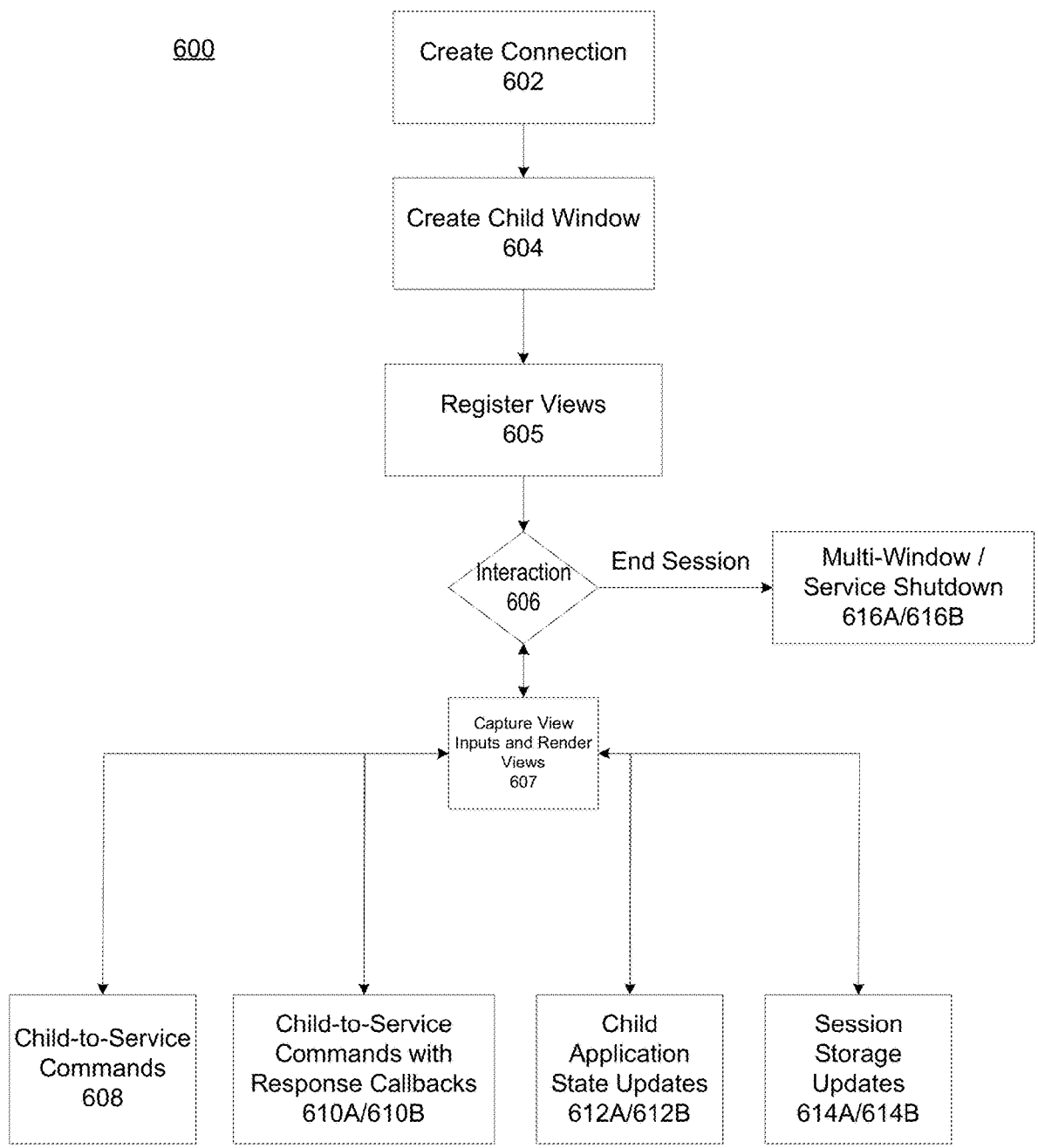
FIG. 6 illustrates an example operational flow in accordance with the present disclosure.
Figure 7A:
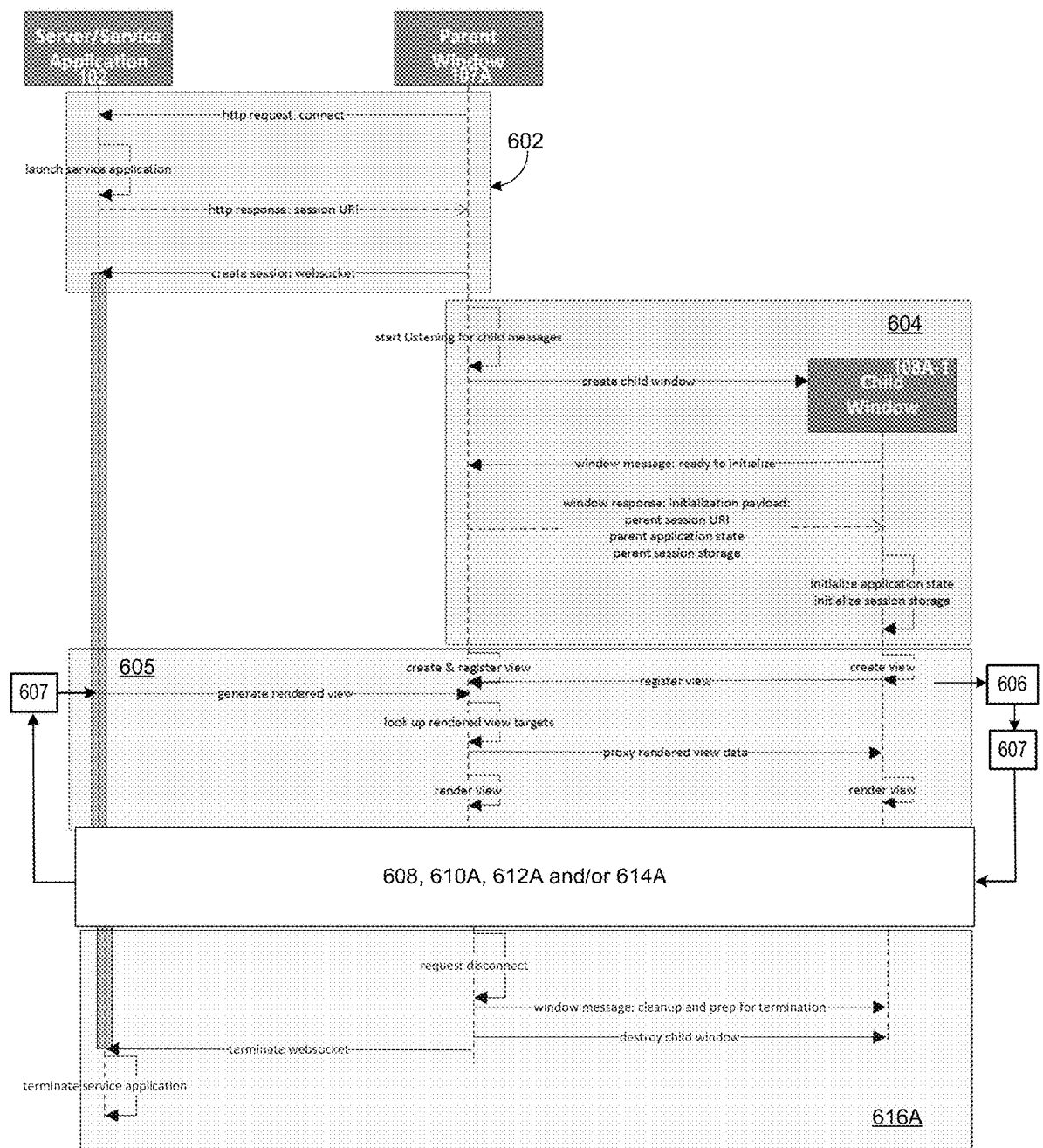
FIGS. 7A-7E illustrate first example call flow diagrams showing functions performed to connect a parent window to the service application, the launching of at least one child window associated with that parent window, and a disconnection process.

With reference to FIGS. 6 and 7A-7E, there is illustrated an operational flow 600 and first example call flow diagrams showing functions performed to connect a parent window to a service application and the launching of at least one child window associated with that parent window. At 602, a remote access connection is created between client application 106A and the service application 102 via the remote access server 104. Referring to FIG. 7A, there is an overview of the call flows of this first implementation of the operational flow of FIG. 6. The operations performed at 602 include making an HTTP request from the parent window 107A associated with the client application 106A to the service application 102. Next, the service application 102 provides an HTTP response to the parent window 107A that includes a session Uniform Resource Identifier (URI). A session is created between the parent window 107A and the service application 102 over, e.g., a websocket connection or using an HTTP/HTTPS request/response protocol.

At 604, the child window 108A-1 associated with the parent window 107A may be created. With reference FIG. 7A, after the session is created between the parent window 107A and the service application 102, the parent window 107A listens for child messages. Next, the child window 108A-1 sends a window message to the parent window 107A indicating that it is ready to initialize. The parent window 107A responds with an initialization payload, which may include a parent session URI, a parent application state, and a parent session storage. The child window 108A-1 initializes its application state and session storage.

At 605, the parent window 107A creates and registers its view with the service application 102. The child window 108A-1 also creates a view that is registered with the parent window 107A. At this point, the child window 108A-1 is ready to communicate with the service application 102 through the parent window 107A, as a proxy.

At 606, an interaction is performed in the views at the either the parent window 107A or the child window 108A-1. In accordance with the type of interaction, one or more of several operations 608-616A/B may be performed. In particular, any of operations 608-614A/B may be performed alone or in combination with others of operations 608-514A/B in response to an interaction in the child window 108A-1. An interaction in the parent window 107A to terminate the session with invoke the operation at 616A/B.

At 607, multiple operations may be performed. For example, in response to an interaction at 606, the inputs received in view(s) may be captured and acted upon, as described in 608-614. As another example, after operations at 608-614 are performed, the service application 102 may send a rendered view of itself to the parent window 107A. The parent window 107A performs a look up of rendered view targets and proxies the rendered view to the child window 108A-1. Both the parent window 107A and child window 108A-1 render initial views of the service application 102.

Child-to-Service Commands

Figure 7B:
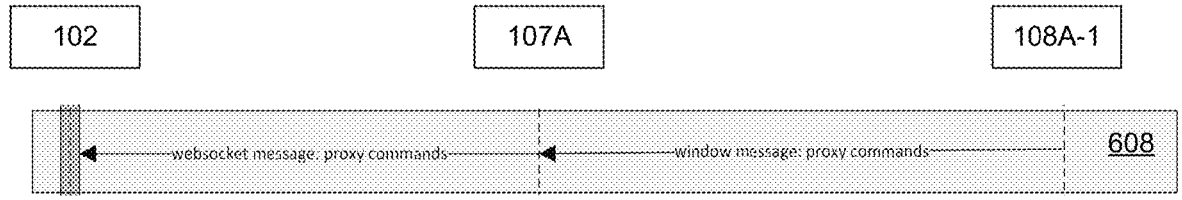

At 608, in response to an interaction in the child window 108A-1, service commands are communicated. With reference to FIG. 7B, the child window 108A-1 sends a window message with proxy commands to the parent window 107A. The parent window 107A then forwards the proxy commands through a websocket message to the service application 102.

Child-To-Service Commands With Response Callbacks

Figure 7C:
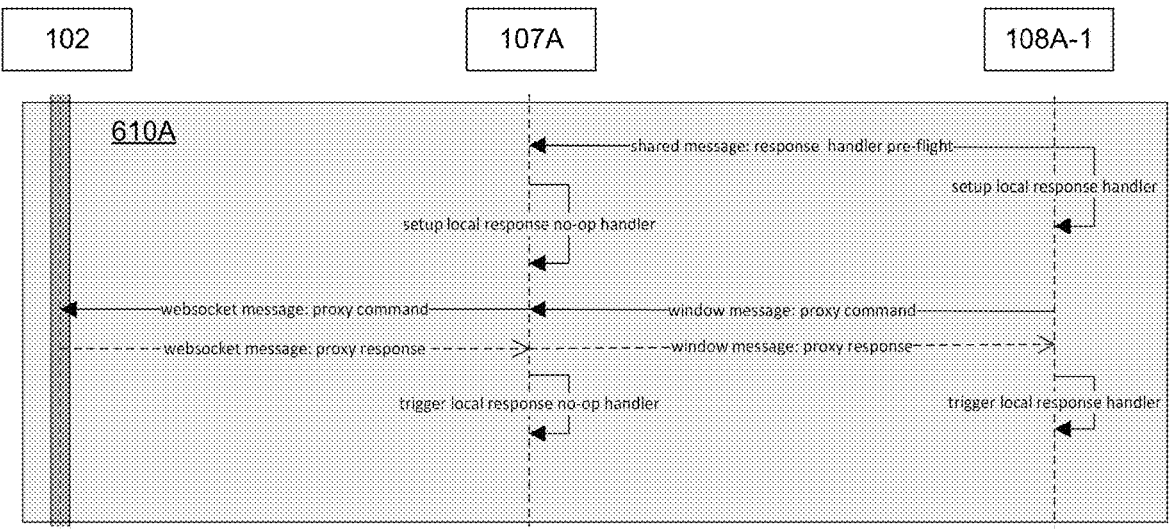

At 610A, in response to an interaction in the child window 108A-1, child-to-service commands with response call backs are performed. With reference to FIG. 7C, a shared message is sent from the child window 108A-1 to the parent window 107A, which sets up a no-op handler. The child window 108A-1 sets up its own response handler. After the handlers are set up, the child window 108A-1 sends a window message containing a proxy command to the parent window 107A. The parent window 107A communicates a proxy command as a websocket message to the service application 102. The service application 102 responds with a proxy response in a websocket message to the parent application 107A. The parent application 107A then forwards that proxy response as a window message to the child window 108A-1. The local response handler at the child window 108A and the no-op handler at the parent window 107A may trigger in accordance with the response.

Child Application State Updates

Figure 7D:
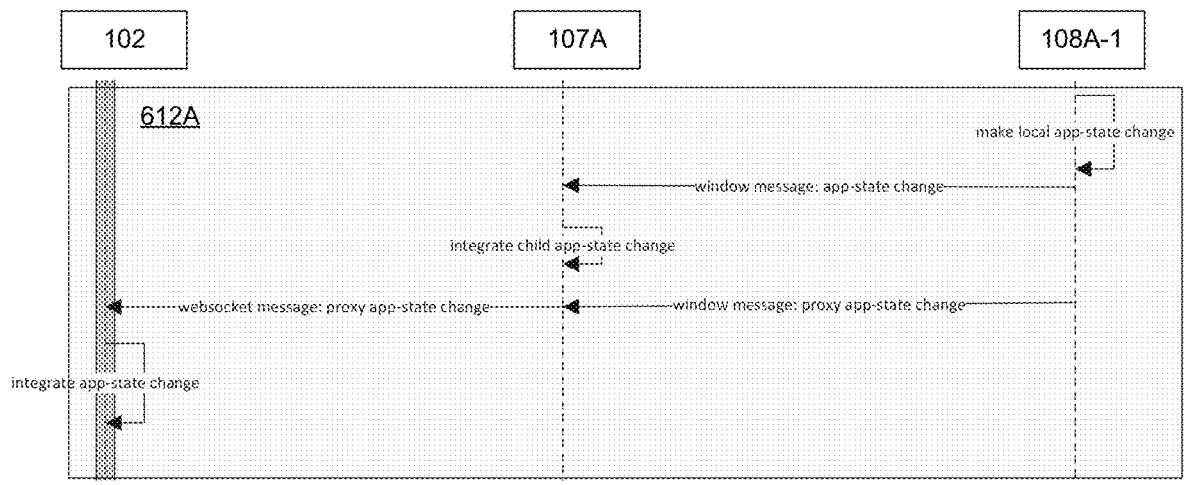

At 612A, in response to an interaction in the child window 108A-1, child application state updates are performed. With reference to FIG. 7D, a local application state change may be made at the child window 108A-1. The application state changes are sent as a shared message to the parent window 107A, which acts on the changes in the application state. Next, a window message is sent from the child window 108A-1 to the parent window 107A containing application state change information. This application state information is then proxied by the parent application 107A to the service application 102 as a websocket message. The service application 102 then integrates the application state change.

Session Storage Updates

Figure 7E:
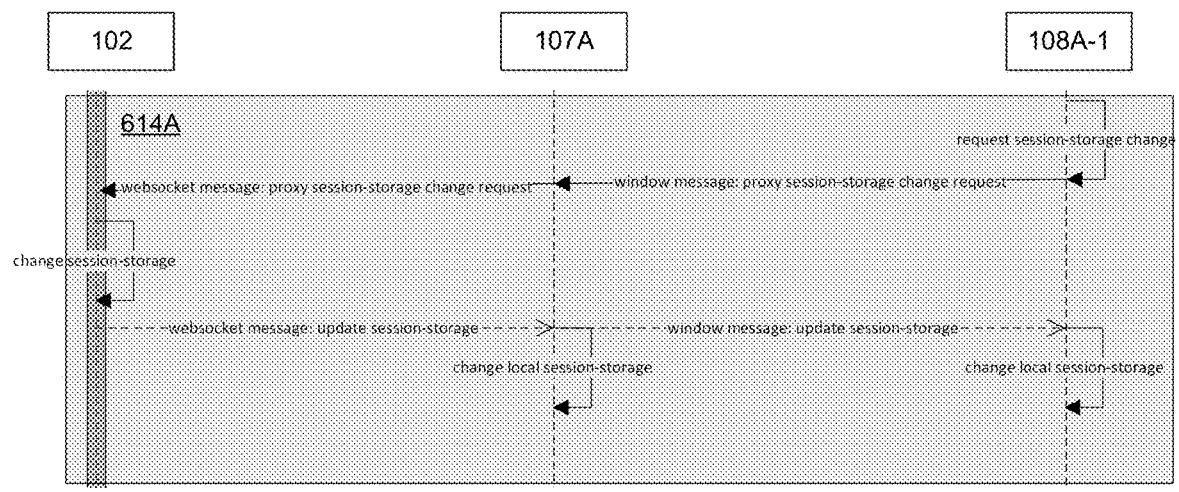

At 614A, in response to an interaction in the child window 108A-1, session storage updates are performed. With reference to FIG. 7E, the child window 108A-1 requests a session storage change. The session storage change request is then forwarded as a window message to the parent window 107A. The parent window 107A then forwards the session storage change request to the service application 102 in a websocket message. The service application 102 then performs the session storage change. As noted above, the service application 102 maintains a map of all private data stores (i.e., session storage). The service application 102 then forwards the updated session storage information to the parent window 107A as a websocket message. The parent window 107A then performs a local session storage change in accordance with the information received from the service application 102. The updated session storage information is then forwarded as a window message to the child window 108A-1, which then performs a local session storage change.

Multi-Window/Service Shutdown

At 616A, in response to an interaction in the parent window 107A, the windows and service application are shut down once a session is completed. With reference to FIG. 7A, the parent window 107A requests to disconnect from the child window 108A-1. A window message is sent from the parent window 107A to the child window 108A-1 to clean up and prepare for termination. Next, a destroy child window command is sent from the parent window 107A to the child window 108A-1. The parent window 107A then terminates the websocket connection with the service application 102 associated with the session. The service application 102 then terminates.

Example Operational Flow of a Multi-Window Architecture with Collaboration

Figure 8A:
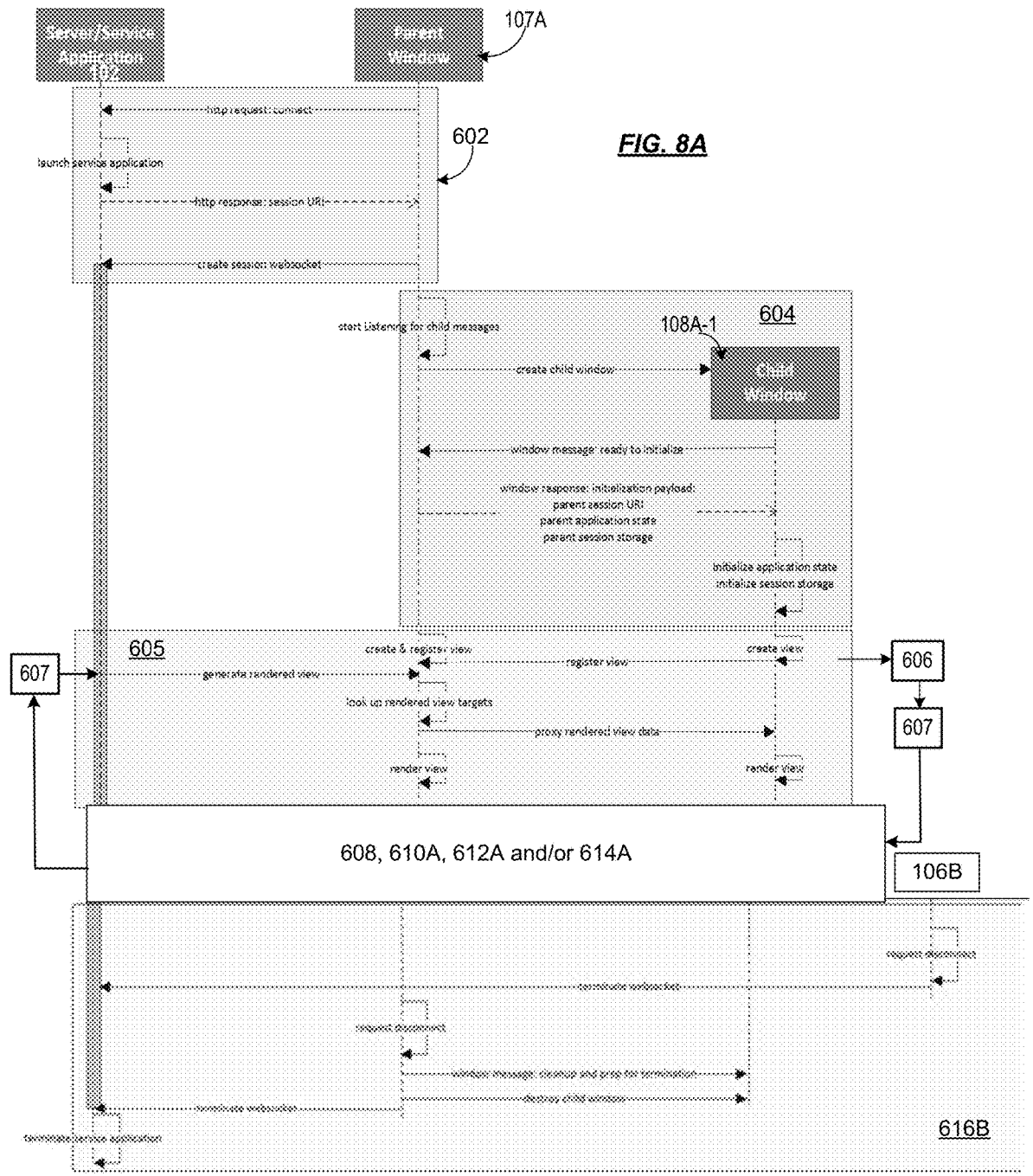
FIGS. 8A-8D illustrate second example call flow diagrams showing functions performed to connect the parent window to the service application, the launching of at least one child window associated with that parent window and collaboration with another client application, and a disconnection process.

With reference to FIGS. 6, 7B, and 8A-8D, there is illustrated second example call flow diagrams showing functions performed to connect a parent window to a service application, the launching of at least one child window associated with that parent window and collaboration with one or more collaborator client application(s) 106B. FIG. 8A illustrates an overview of the call flows of this second implementation of the operational flow of FIG. 6. For this second implementation, the operations performed at 602-608 of FIGS. 6 and 7B are substantially the same as described above and are not repeated.

Child-to-Service Commands with Response Callbacks

Figure 8B:
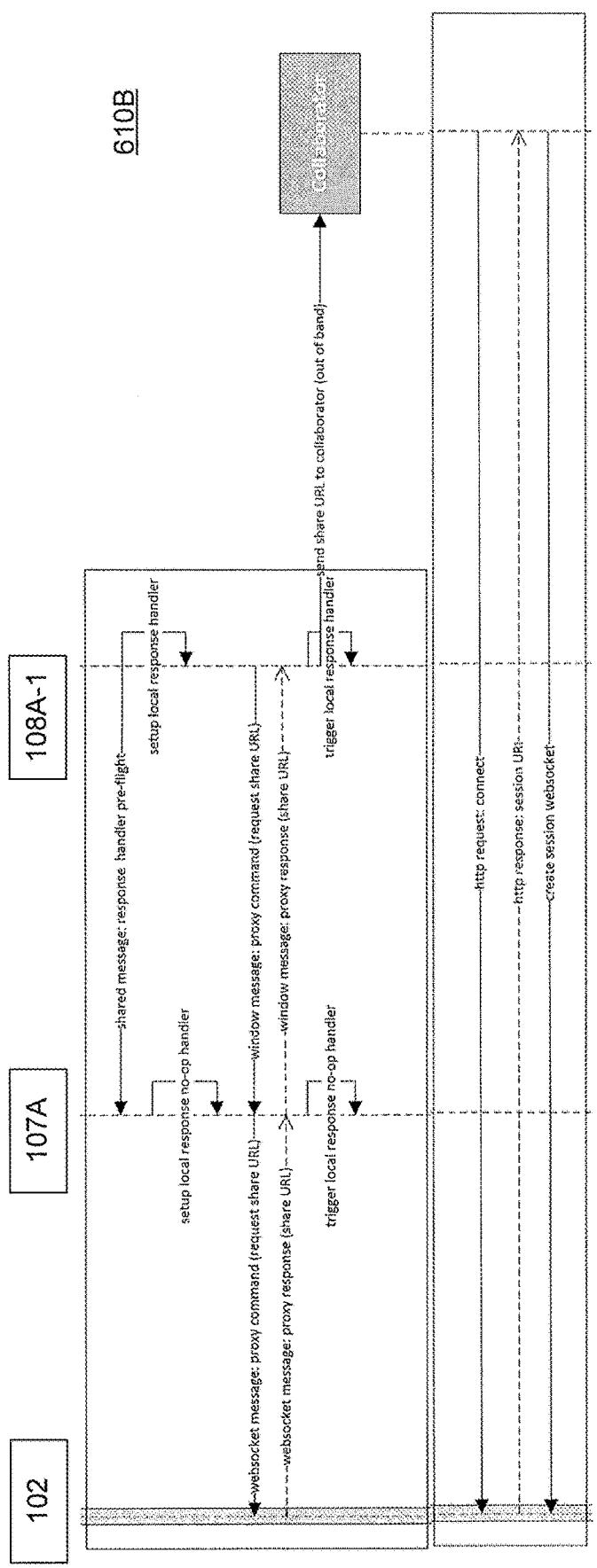

With reference to FIG. 6, at 610B, in response to an interaction in the child window 108A-1, child-to-service commands with response call backs are performed. As shown in FIG. 8B, a shared message is sent from the child window 108A-1 to the parent window 107A, which sets up a no-op handler. The child window 108A-1 sets up its own response handler. After the handlers are set up, the child window 108A-1 sends a window message containing a proxy command to the parent window 107A. The parent window 107A communicates a proxy command as a websocket message to the service application 102. The service application 102 responds with a proxy response in a websocket message to the parent application 107A. The parent application 107A then forwards that proxy response as a window message to the child window 108A-1. The local response handler at the child window 108A and the no-op handler at the parent window 107A may trigger in accordance with the response.

In this example collaboration implementation, the child window 108A-1 may invite a collaborator (e.g., collaboration client application 106B) to join the session with the service application 102. When the collaboration client application 106B is to be joined to the session, an out-of-band message (e.g., an e-mail, SMS message, etc.) containing a URL link to the session may be forwarded to the collaboration client application 106B. The collaboration client application 106B may use the link to send an HTTP request to connect to the service application 102. The service application 102 responds by providing the session URI to the collaboration client application 106B. Thereafter, the collaboration client application 106B joins the session with the service application 102.

Child Application State Updates

Figure 8C:
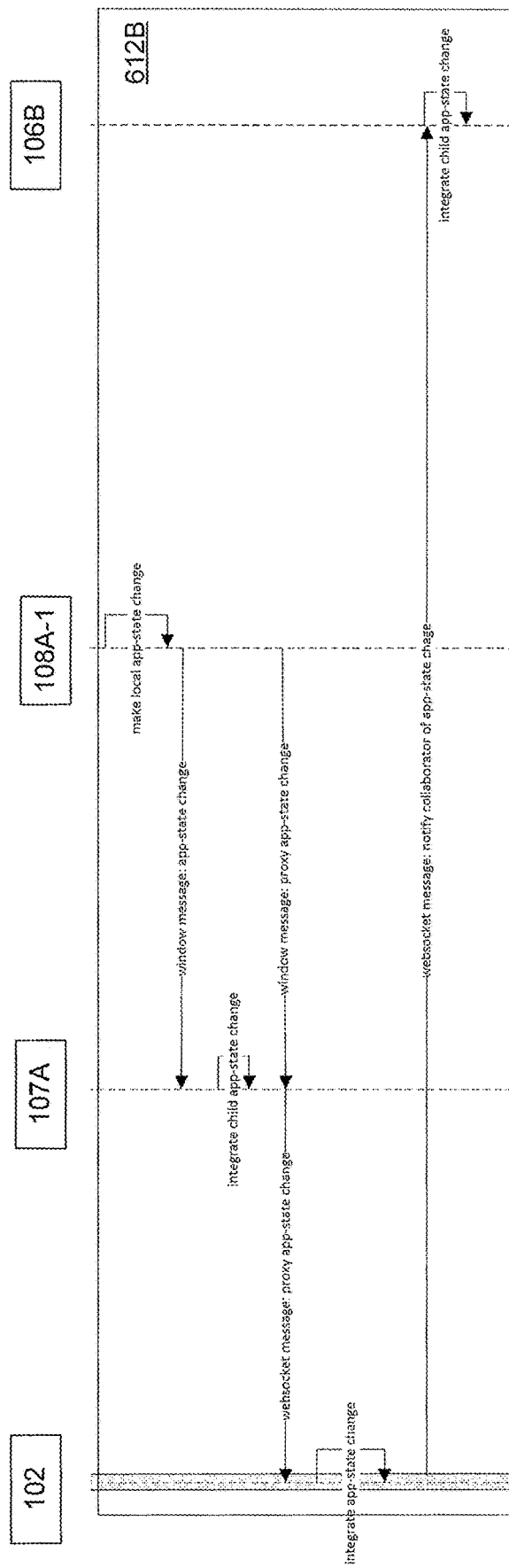

At 612B, in response to an interaction in the child window 108A-1, child application state updates are performed. With reference to FIG. 8C, a local application state change is made at the child window 108A-1. The application state changes sent as a shared message to the parent window 107A, which integrates (e.g., merges differencing scripts) the child application state change. Next, a proxy message is sent from the child window 108A-1 to the parent window 107A containing application state change information. This application state information is then forwarded by the parent application 107A to the service application 102 as a websocket message. The service application 102 then integrates the application state change. The service application then sends a websocket message to notify the collaboration client application 106B of the application state change. In response thereto, the collaboration client application 106B updates its application state.

Session Storage Updates

Figure 8D:
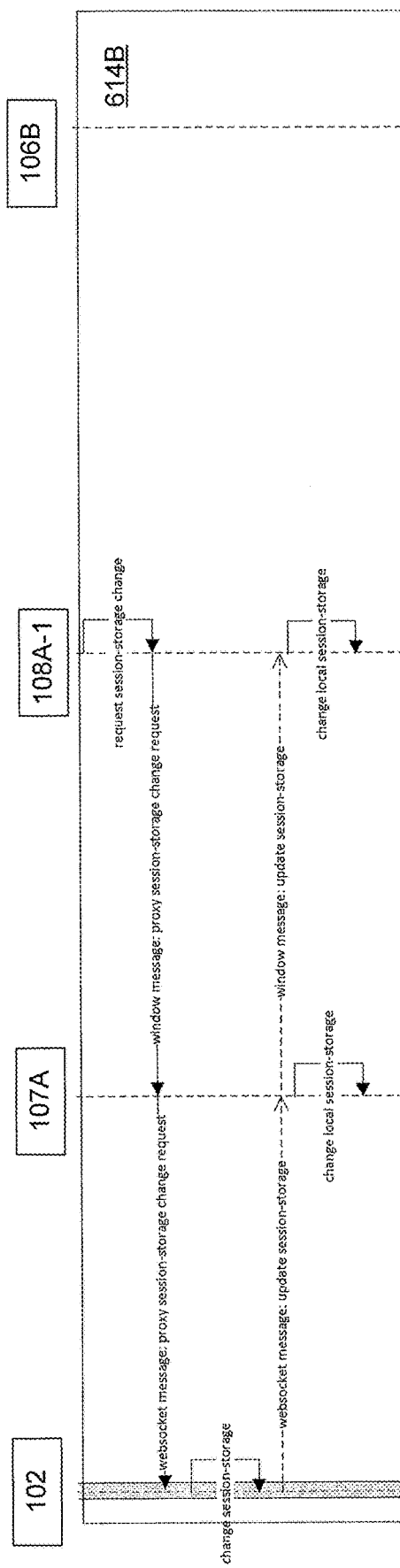

At 614B, in response to an interaction in the child window 108A-1, session storage updates are performed. With reference to FIG. 8D, the child window 108A requests a session storage change. The session storage change request is then forwarded as a proxy message to the parent window 107A. The parent window 107A then forwards the session storage change request to the service application 102 in a websocket message. The service application 102 then performs the session storage change. As noted above, the service application 102 maintains a map of all private data stores (i.e., session storage). The service application 102 then forwards the updated session storage information to the parent window 107A as a websocket message. The parent window 107A then performs a local session storage change in accordance with the information received from the service application 102. The updated session storage information is then forwarded as a window message to the child window 108A-1, which then performs a local session storage change.

Multi-Window/Service Shutdown

At 616B, in response to an interaction received from the collaboration client application 106B, as shown in FIG. 8A, the collaboration client application 106B may request a disconnect that terminates its websocket connection with the service application 102. Optionally or additionally, in response to an interaction in the parent window 107A, may request to disconnect from the child window 108A-1. A window message is sent from the parent window 107A to the child window 108A-1 to clean up and prepare for termination. Next, a destroy child window command is sent from the parent window 107A to the child window 108A-1. The parent window 107A then terminates the websocket associated with the session with the service application 102. The service application 102 then terminates.

In the descriptions above, it is assumed that changes are initiated at the child window 108A-1. However, changes may be initiated by the parent window 107A and/or the collaboration client application 106B. The call flows would, therefore, but altered to reflect the change as coming from the parent window 107A and/or the collaboration client application 106B in accordance with the examples above.

Example Use Cases

FIGS. 9-20 illustrate an example use cases of the multi-window, multi-monitor architecture of the present disclosure. The example user interfaces of FIGS. 9-20 convey the interactions that a user may perform to interact with a service application that implements the multi-window, multi-monitor of the present disclosure. For example, the user may be a physician interacting with diagnostic medical imaging software, such as RESOLUTIONMD, available from Calgary Scientific Inc., Calgary, Alberta, Canada.

Figure 9:
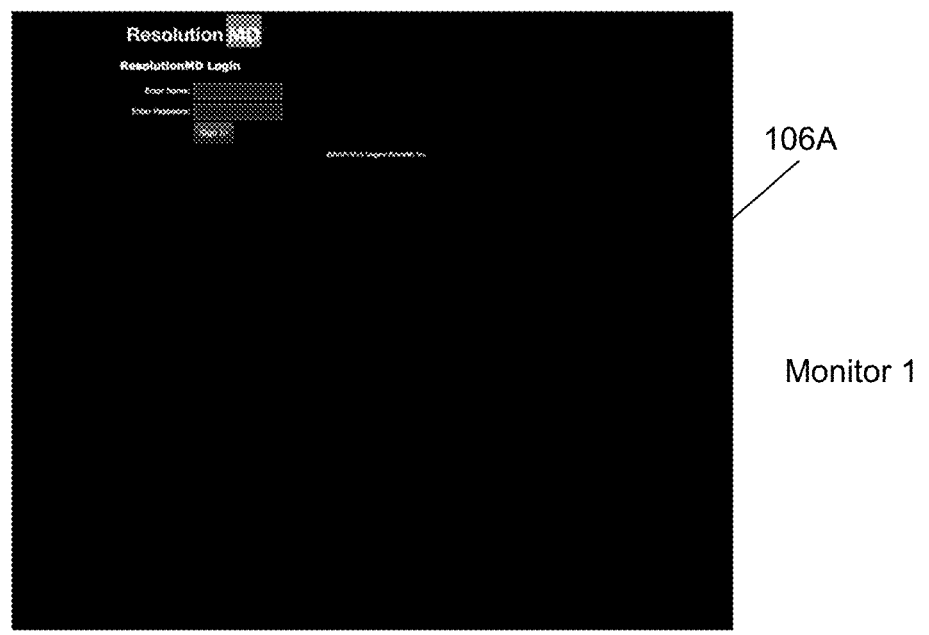
FIGS. 9-20 illustrate user interfaces associated with an example use case of the multi-window, multi-monitor architecture of the present disclosure.
Figure 10:
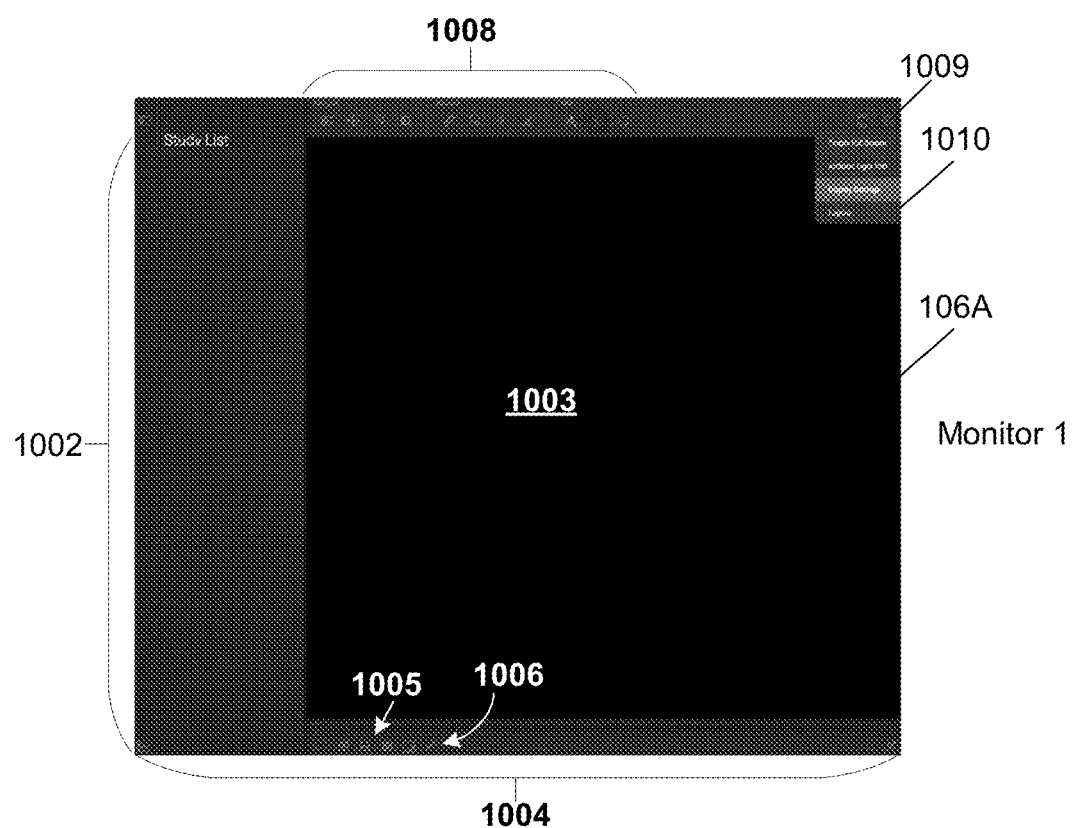

As shown in FIG. 9, a user may initially connect with the service application 102 (e.g., RESOLUTIONMD) using a web browser as the client application 106A. The browser may be displayed on a monitor (e.g., Monitor 1) of the user's computing device. FIG. 10, is provided to introduce aspects of an example user interface of the present disclosure, which includes a data panel 1002 in which information may be received and presented, such as search forms that receive user queries, search results, as study/working list, a data provider, a container item and a container list item. Examples are provided in FIGS. 12-21. An interactive viewing area 1003 is provided to display imagery in a view (or multiple views) and to enable a user to manipulate and select the displayed views. A status bar 1004 is provide that includes layout selection icons 1005 and a link button 1006. The layout selection icons 1005 may be used to change the number of views shown in the interactive image viewer 1003 (see, FIG. 17). The link button 1006 may be used to toggle the interactivity of the parent window 107A and the child window 108A-1. For example, the parent window 107A and the child window 108A-1 have independent interactivity, or the interaction may be linked by and action of the link button 1006. A tool bar 1008 provides access to tools and actions to allow a user to interact with the imagery shown in the interactive image viewer 1003.

Figure 11:
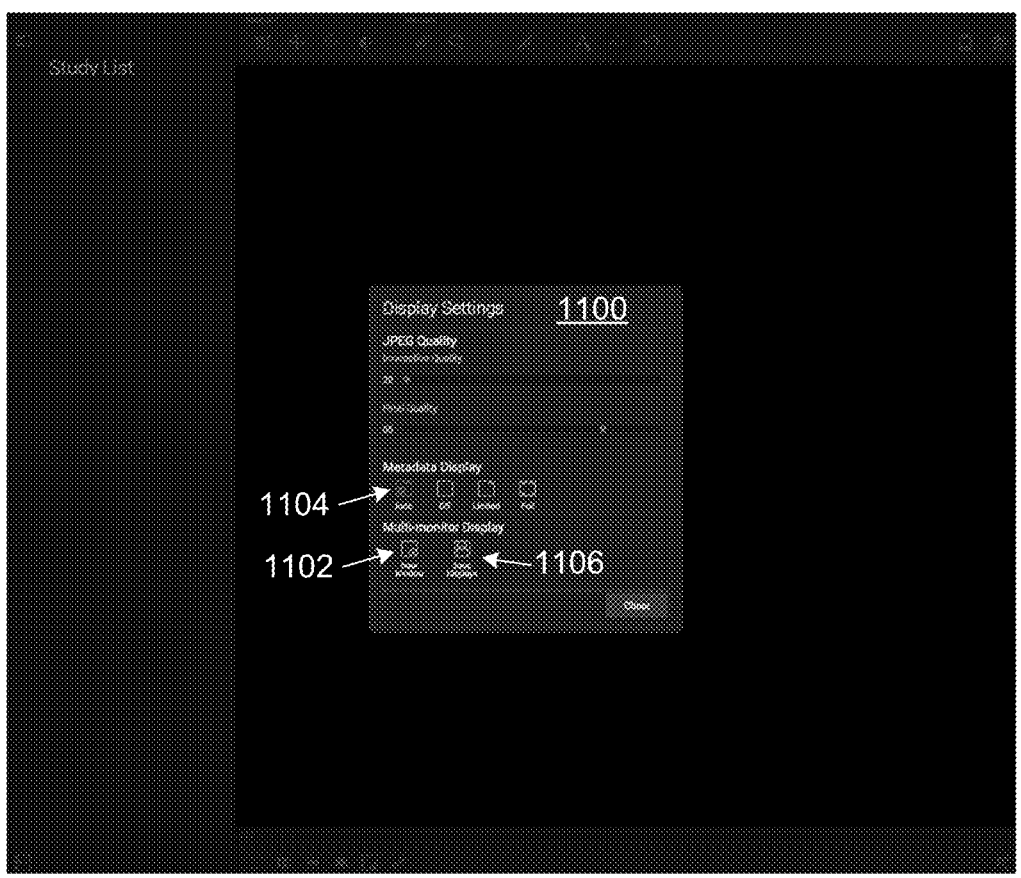

As shown in FIG. 10, a settings icon 1009 provides access to a menu 1010 to configure the multi-window environment and perform other actions. Upon selection of the "Display Settings" option in the menu 1010, a display settings window 1100 may be displayed in the browser, as shown in FIG. 11, wherein the user may make a selection to activate the multi-window environment by selecting a new window icon 1102. The new window icon 1102 activates a child window in accordance with the present disclosure. Any number of child windows may be activated. To control the display of metadata (see, FIG. 14), metadata display settings 1104 are provide to set the display as, e.g., on/off/limited. The layout of the windows may be saved by clicking a saved displays icon 1106.

Figure 12:
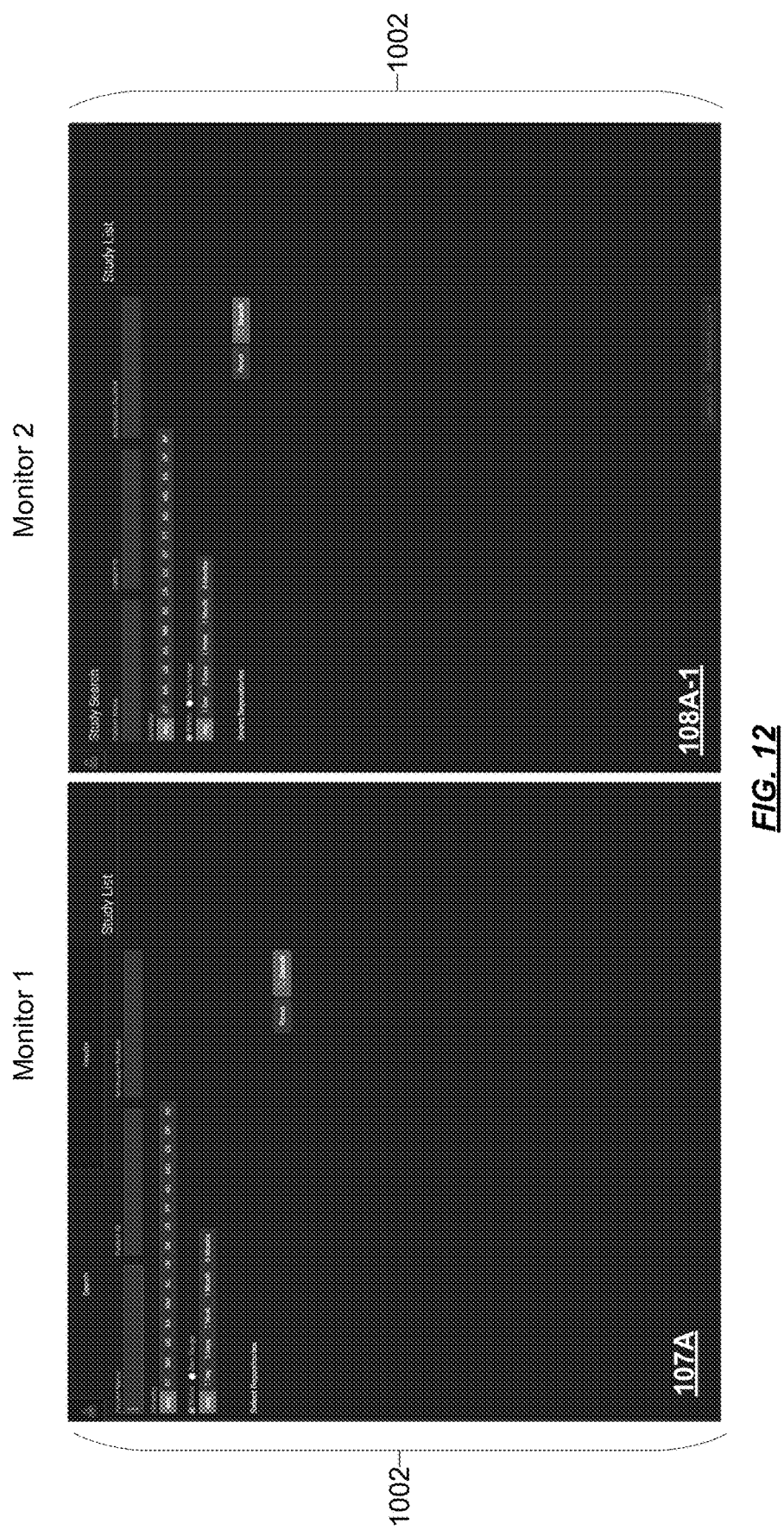

After the user logs on at the interface of FIG. 9, a user interface as shown in FIG. 12 is displayed wherein the parent window 107 and the child window 108A-1 are automatically presented on the user's computing device. In some implementations, the parent window 107 and the child window 108A-1 are initially displayed on one monitor, e.g. Monitor 1. After launching the parent window 107 and the child window 108A-1, in response to a subsequent user action, the child window 108A-1 may be moved to Monitor 2.

Figure 13:
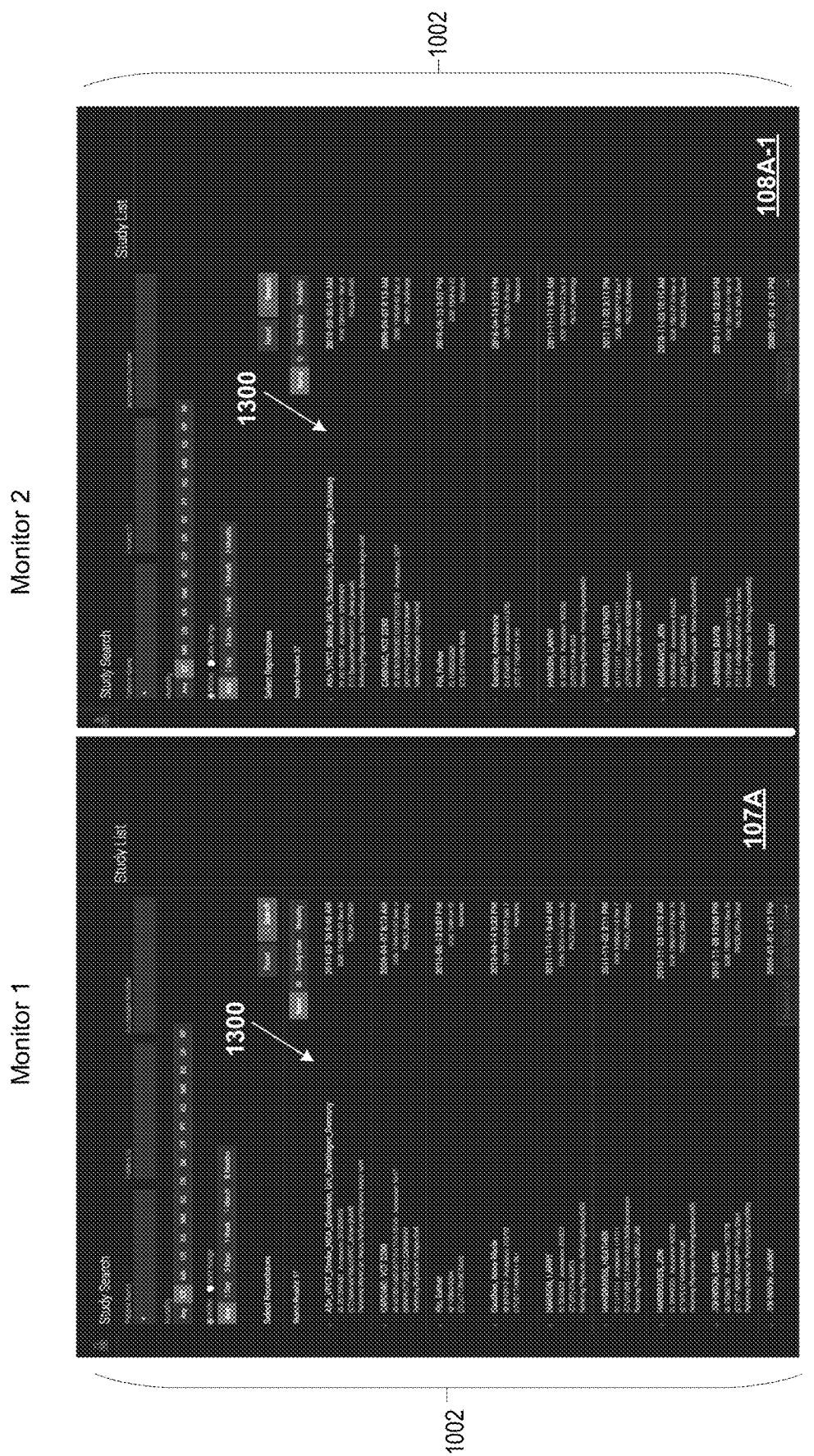
Figure 14:

As further shown in FIG. 12, a Study Search user interface is provided in the data panel 1002 wherein the user may search for a particular patient study. The data panel 1002 may be synchronized between windows and may be shown on both monitors or hidden on one monitor. Responsive to the search, a search results list 1300 may be presented in a user interface, as shown in FIG. 13. As shown in FIG. 14, after user selects a particular patient study, a dataset list 1400 (e.g., series list) within that study is presented in the data panel, which may include a thumbnail image as shown.

Figure 15:
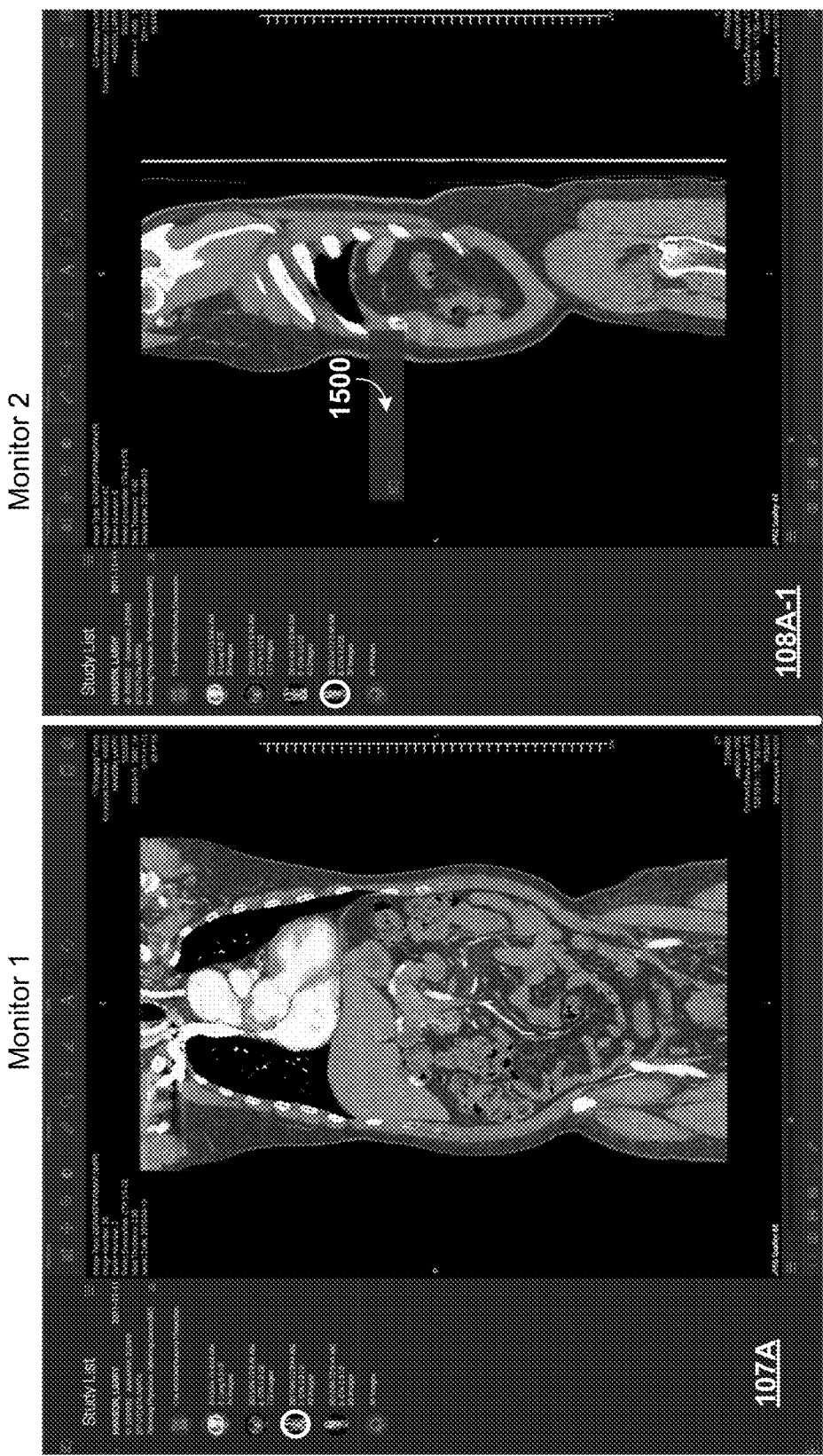
Figure 16:

As shown in FIG. 14, a selection of a dataset (see highlighted circle) will load image data into the interactive image viewer 1003. In this case, an initial display of the same dataset is presented on both the parent window 107 and child window 108A-1. Metadata 1410 shows information about the image being displayed in the interactive image viewer 1003. Patient confidential information 1412 may be shown in the interactive image viewer 1003 (patent confidential information 1412 may be considered metadata as well). As shown in FIG. 15, the user may select a different dataset within the same study to be viewed in the child window 108A-1. FIG. 16 illustrates a different view from the same dataset that is displayed in the child window 108A-1 after, e.g., the item 1500 is dropped in the user interface associated with the child window 108A-1.

Figure 17:
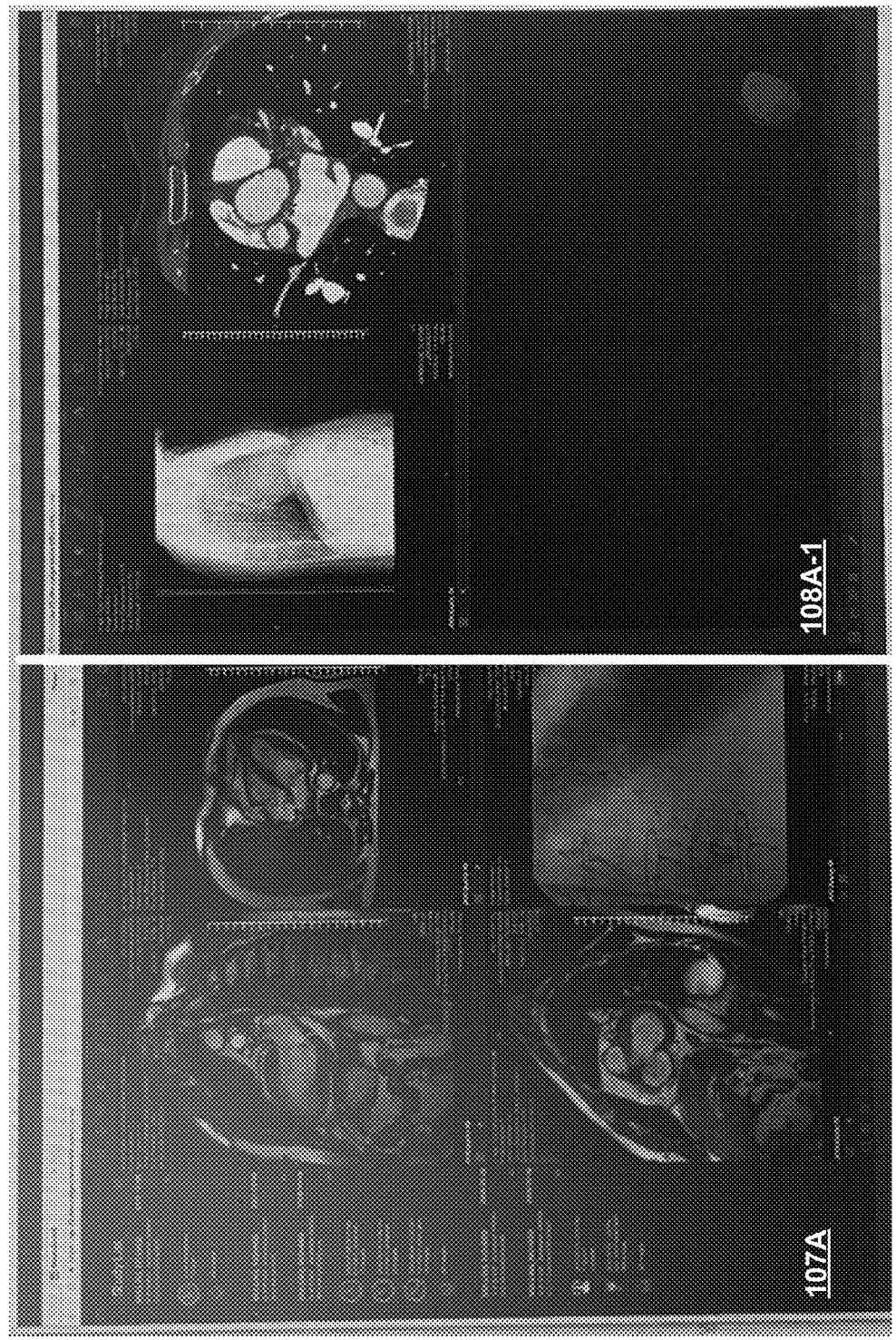

As shown in FIG. 17, the parent window 107 and the child window 108A-1 may each be configured to display multiple views within each window by selecting a layout configuration 1005 and loading datasets into each window such as by drag and drop. In the example of FIG. 17, four views are displayed in the parent window 107 and two are displayed in the child window 108A-1.

Figure 18:
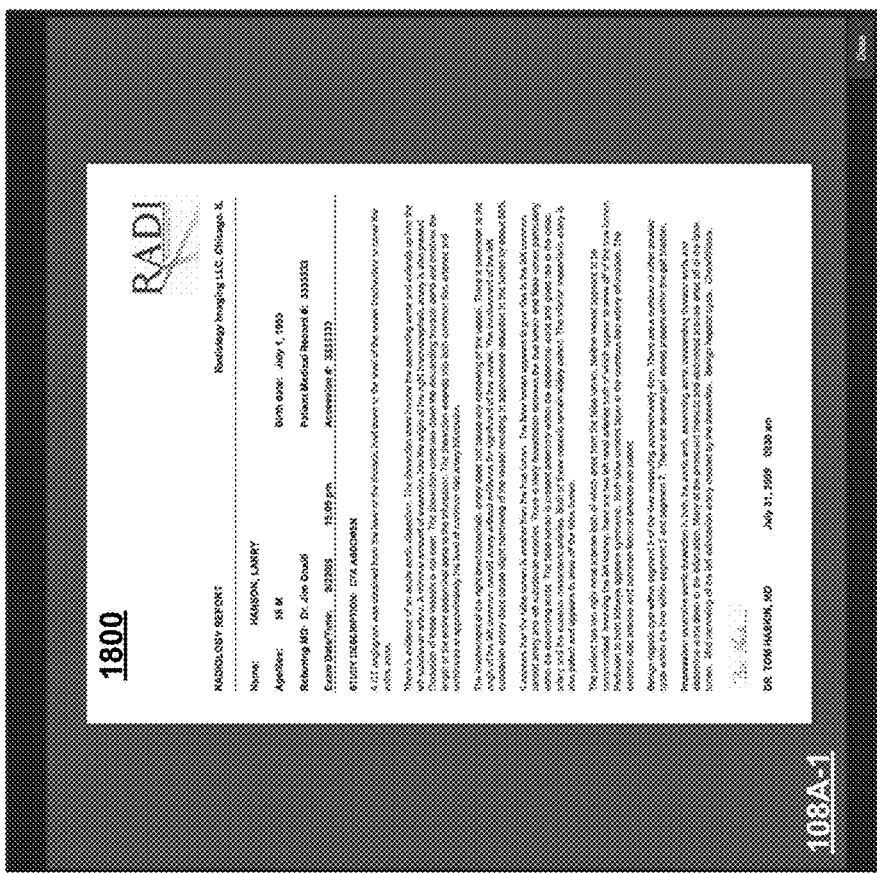
Figure 18:

As shown in FIG. 18, the views are not limited to still images. For example, one (or more) of the views may display test 1800 associated with the patient study. Additionally or optionally, other types of information may be displayed in the views, such as video.

Figure 19:
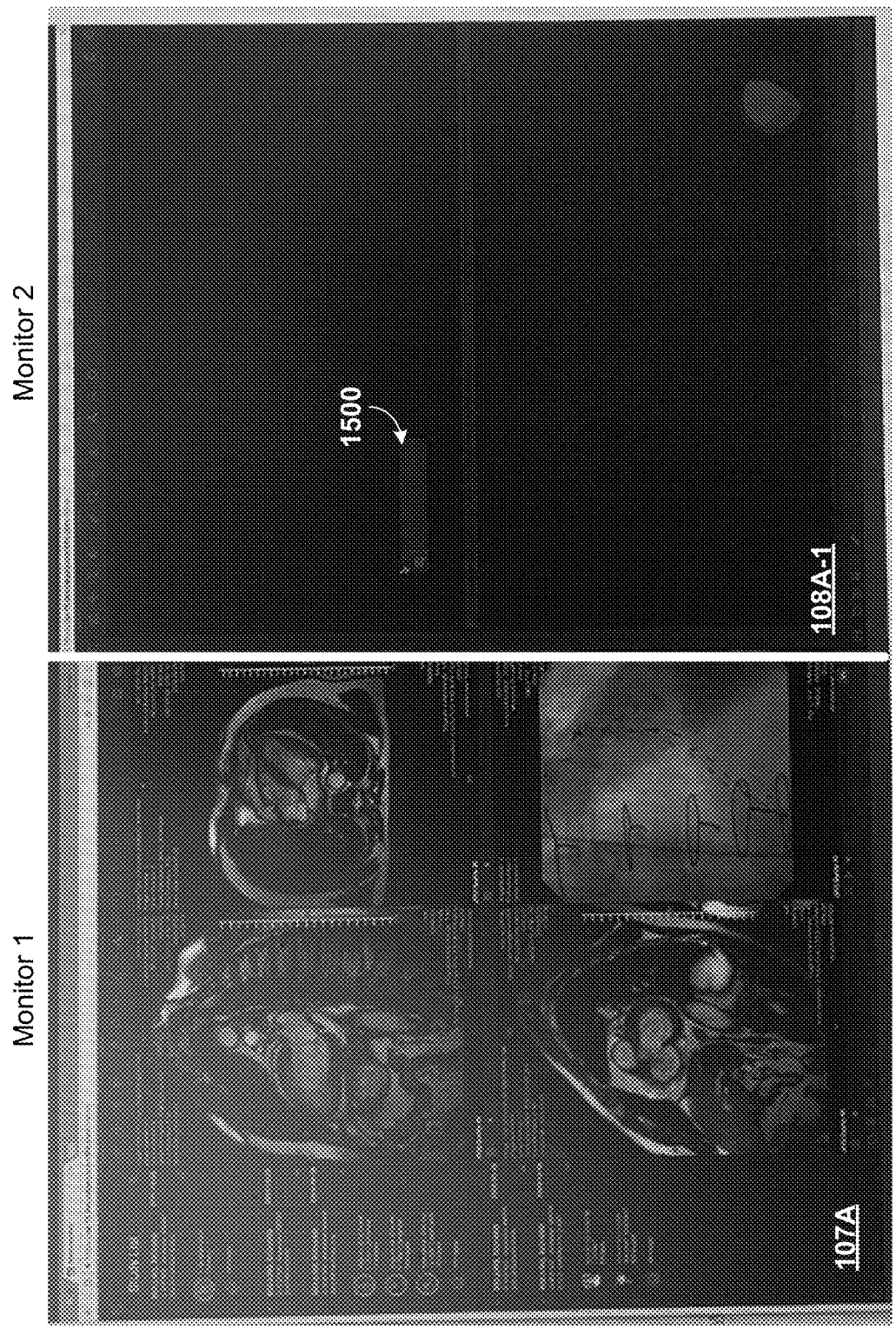
Figure 20:
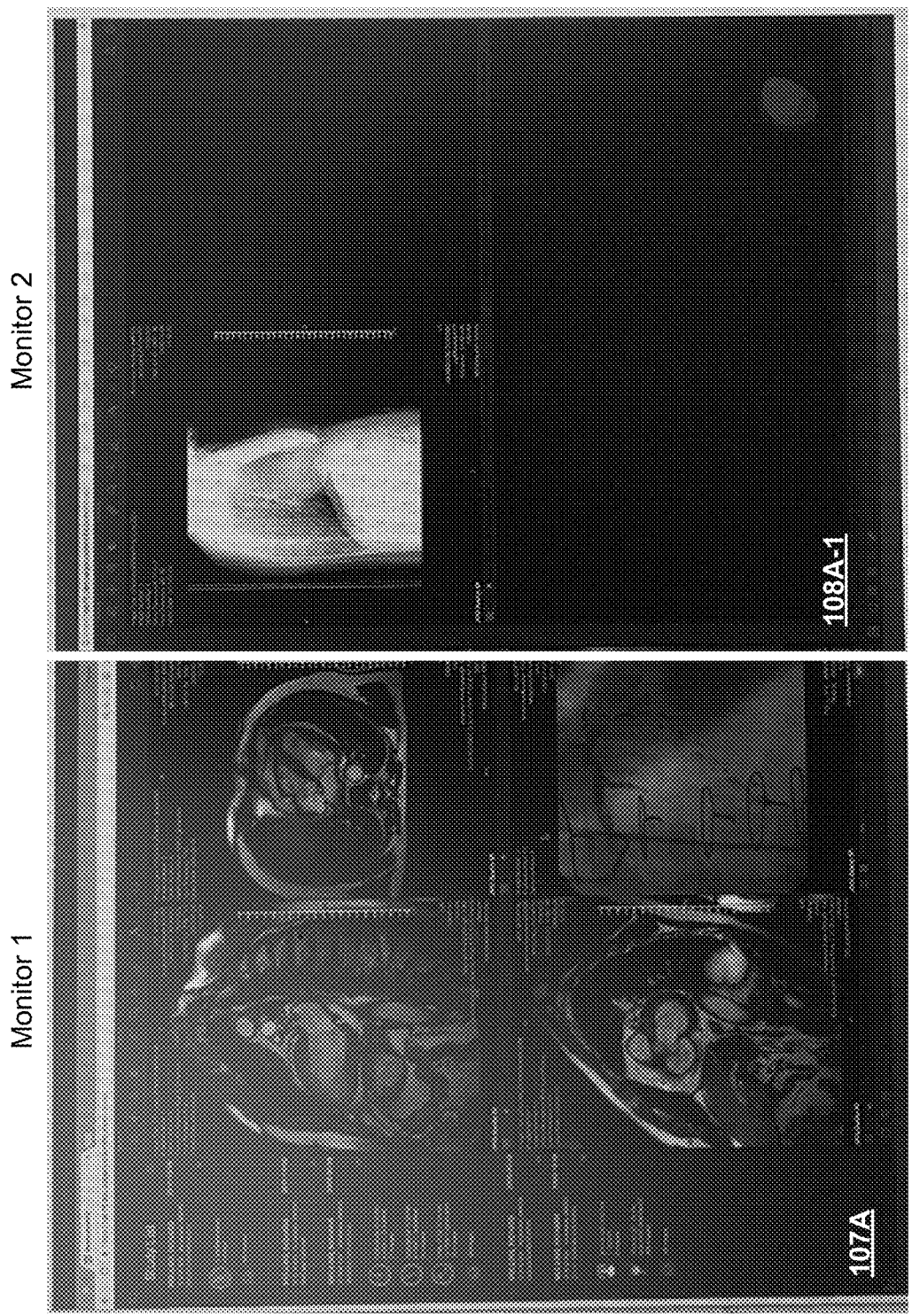

As shown in FIGS. 19 and 20, the user may clear one of the windows (e.g., the child window 108A-1) and drag-and-drop an item 1500 from the data panel 1002 to present a new view in the child window 108A-1. FIG. 20 illustrates the resulting view displayed in the child window 108A-1 after the item 1500 is dropped in the user interface associated with the child window 108A-1. Thus, the layout and display of the parent and child viewers can be independently configured as desired by the user.

In some implementations, a save button may be provided to save window configurations (i.e., window positions and settings) so that a user may store a window configuration. The window configuration may also be automatically saved when the user closes a session. This feature may be implemented using a browser extension. The saved configurations may be saved as a string value in the browser's localStorage for later retrieval.

Thus, as would now be understood by one of ordinary skill in the art, the multi-window, multi-monitor architecture of the present disclosure may be used to display information from a service application in multiple views such that the amount and types of information that are simultaneously displayed may be arranged to aid the user's interpretation and/or interaction with data and interfaces associated with the service application.

Collaboration-Specific Example User Interface

Figure 21A:
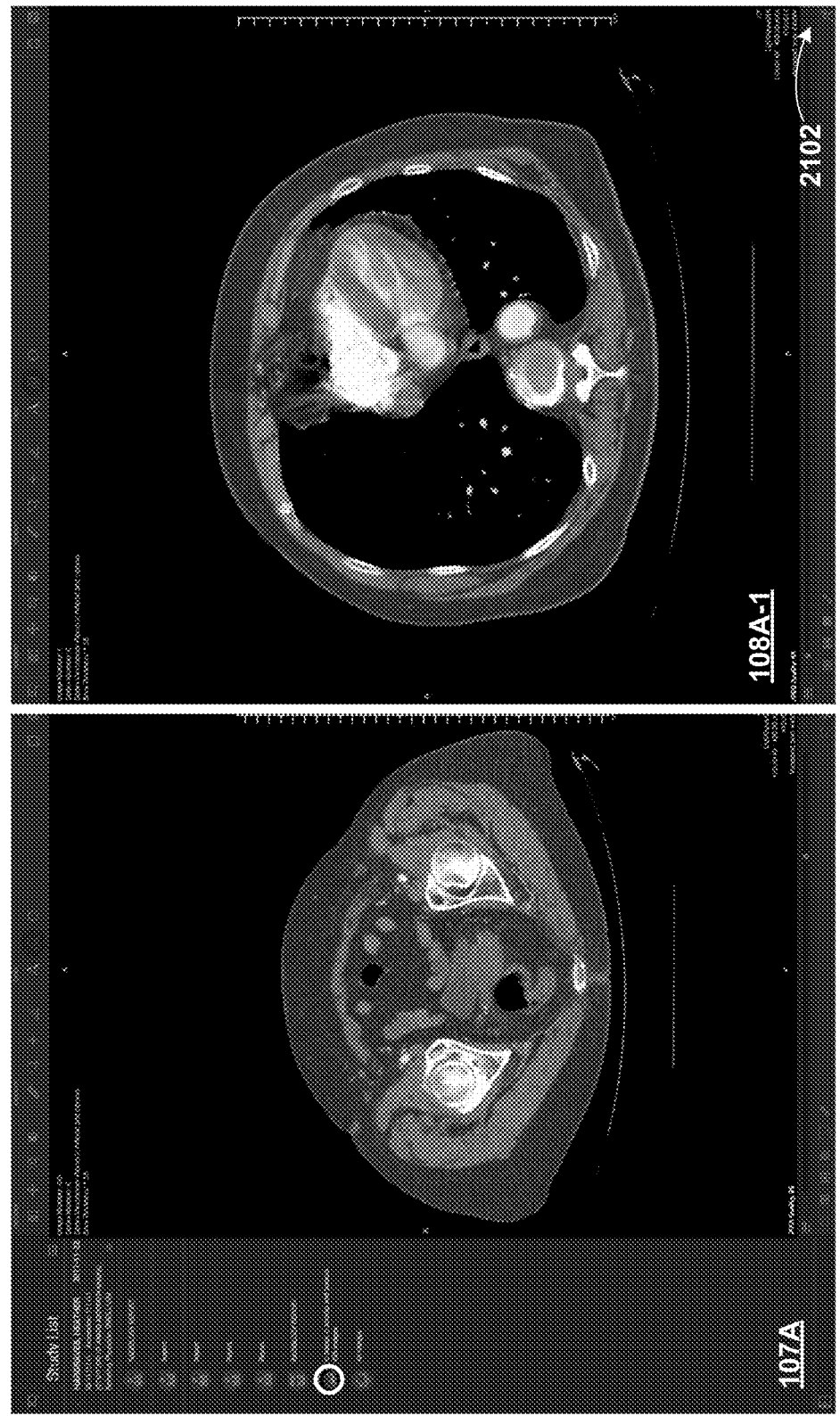
FIGS. 21A-21C illustrate an example collaboration-specific workflow and user interface.

FIG. 21A illustrates an example user interface wherein a user of a client application is viewing a medical image presented by a medical viewing application (as the service application 102) in a parent window 107A and child window 108A-1. During the interaction with the medical viewing application, the user may wish host a collaboration session with another client.

Figure 21B:
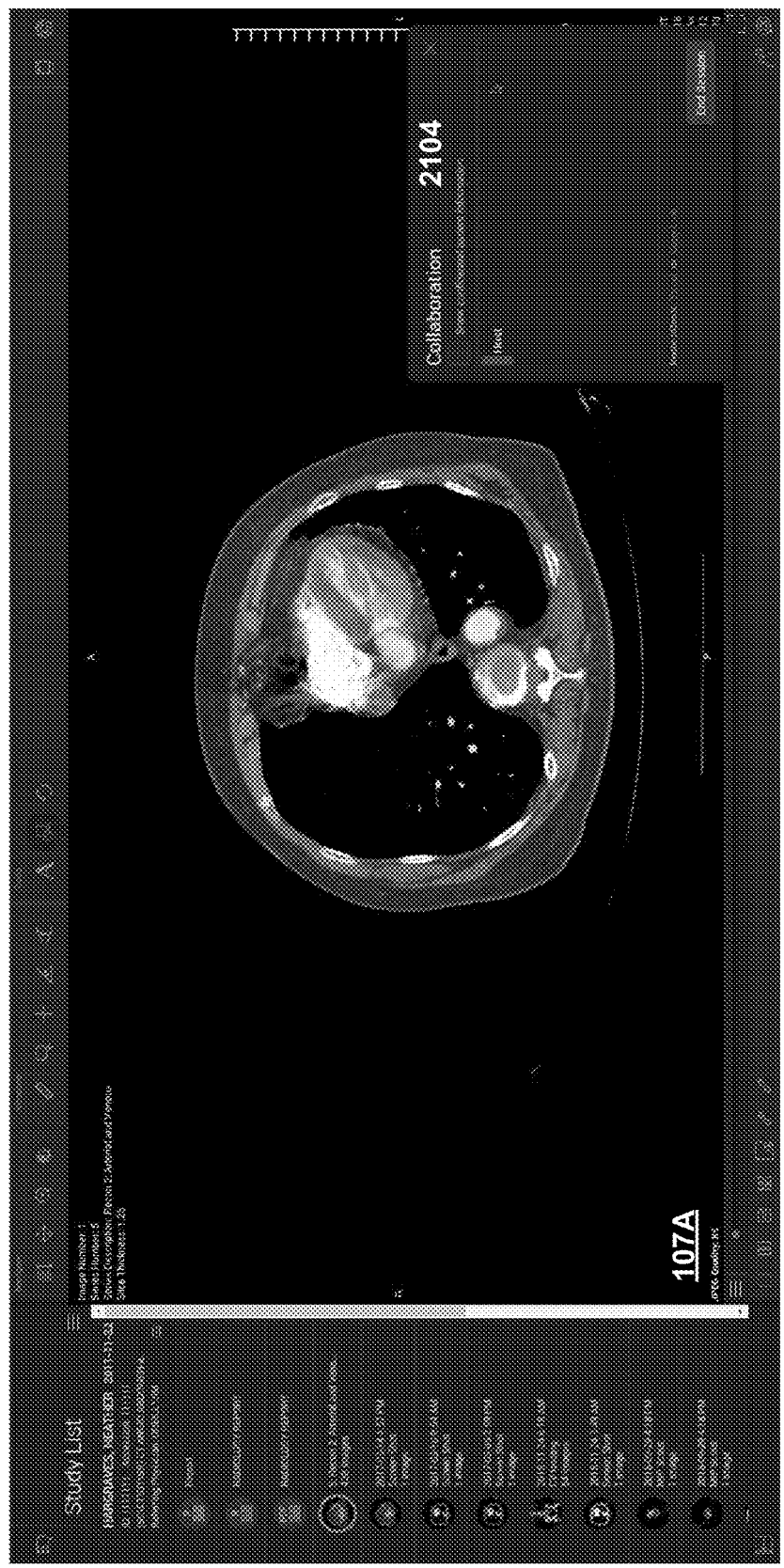

FIG. 21B shows a control 2104 that enables the user hosting the collaboration session to switch off/on the patient confidential information 1412. Further, in FIGS. 21A-21C, the display of metadata 1410 may be turned off by action of the metadata display settings 1104 (see, FIG. 11). The amount of metadata 1410 (i.e., on/off/limited) and the patient confidential information 1412 may be set by the host to protect sensitive information from being inadvertently shared with the collaborator.

Figure 21C:
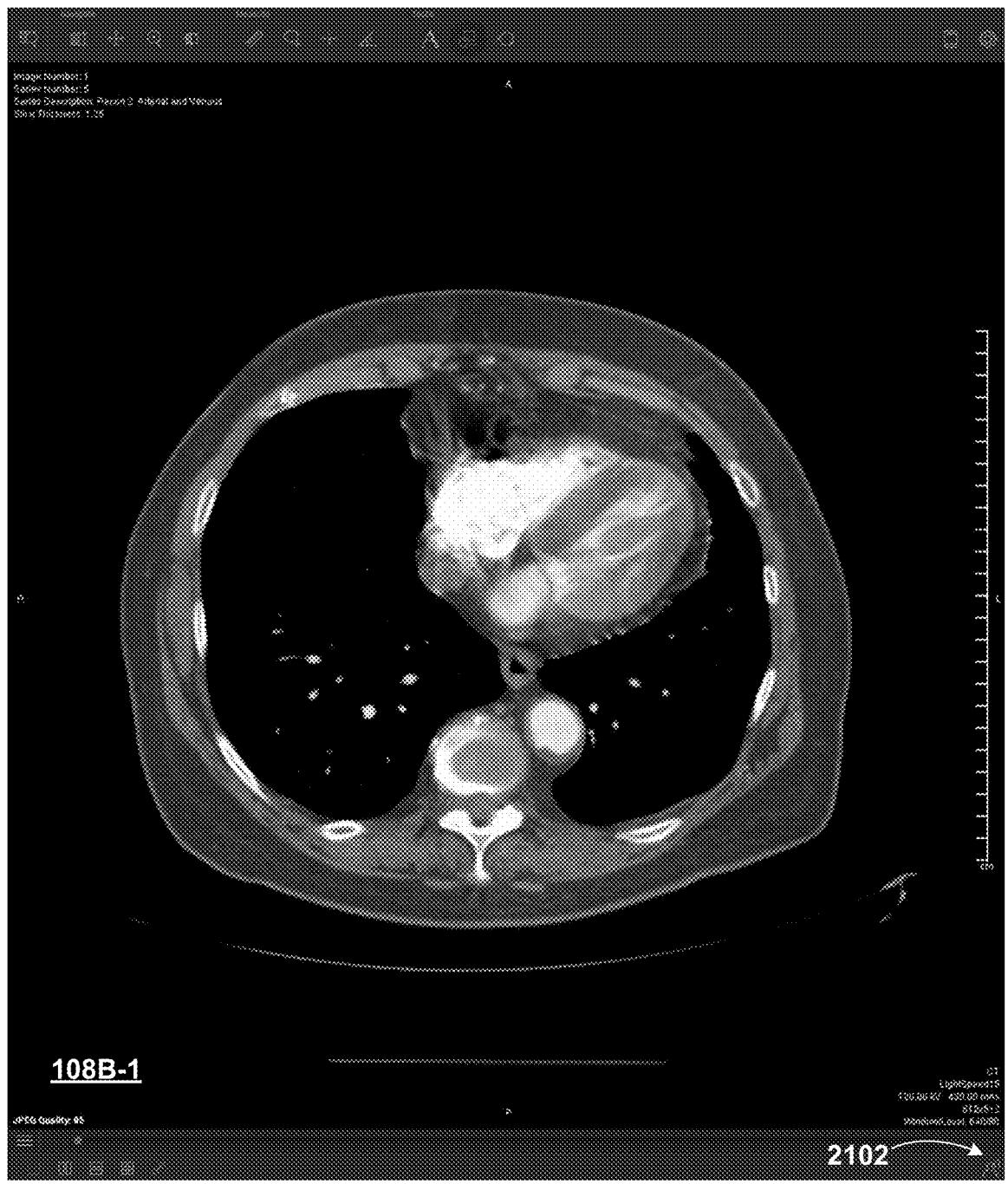

FIG. 21C shows the child window 108B-1 of the client who is collaborating with the user. After the collaboration session is established, the two clients will be collaboratively interacting with, e.g., the medical viewing application of FIG. 21A. In this example, the child window 108A-1 is shared with the collaborator. An "army of people" icon 2102 may be provided to show that the window is in a collaboration session (e.g., the child window 108A-1 and the child window 108B-1). A "people+" icon 2104 in the parent window 107A (FIG. 21A) shows that the user is the host of the collaboration session. Thus, the collaborator, who is viewing images at the child window 108B-1, sees the same images as the host at the child window 108A-1.

Context Specific User Interfaces

Figure 22:
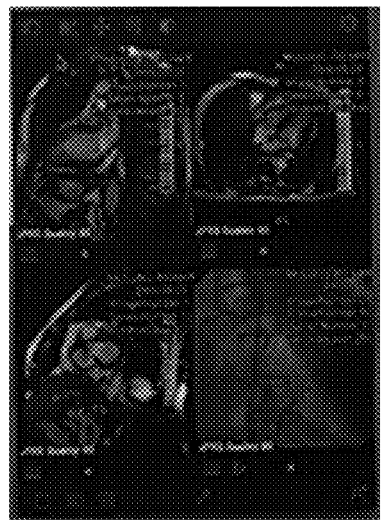
FIGS. 22-25 illustrate context-specific user interfaces.
Figure 23:
Figure 24:
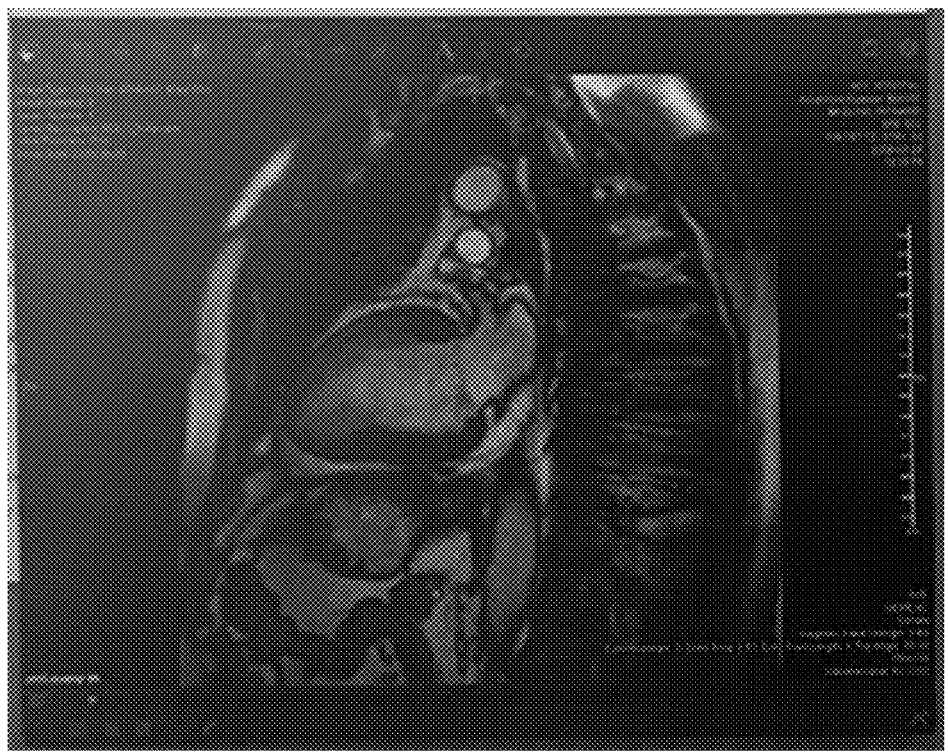
Figure 25:
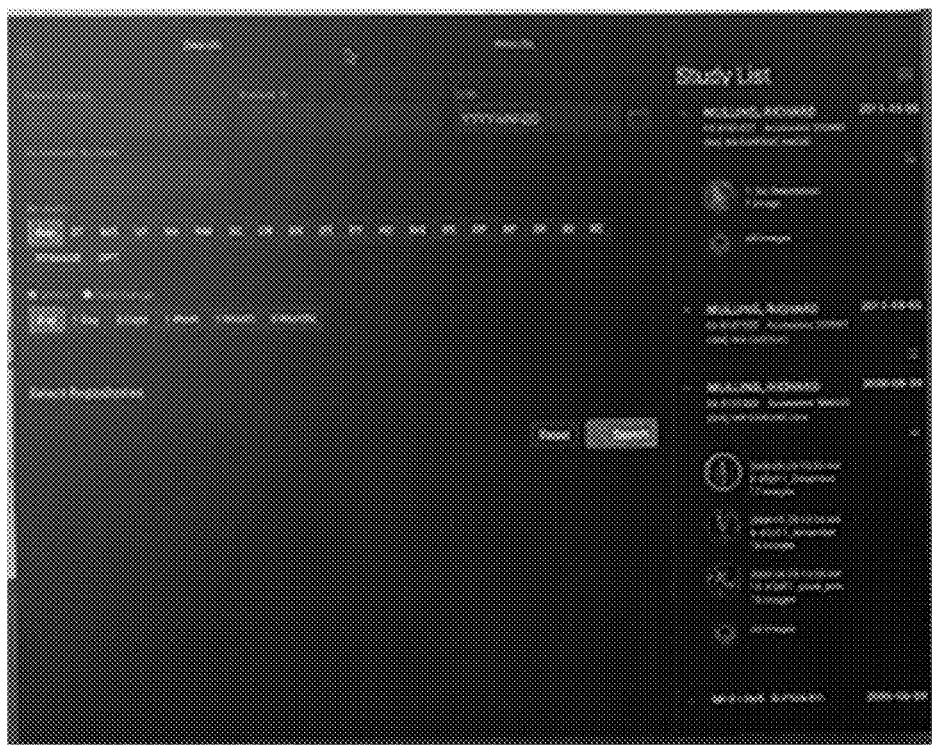

FIGS. 22-25 illustrate context-specific user interfaces. The user interfaces of FIGS. 9-21 are shown as they would be displayed on monitors of a computing device, such as a desktop computer or workstation. However, in accordance with an aspect of the present disclosure, the user is not limited to interacting with service application 102 on a desktop computer or workstation. As such, the user interfaces may be context specific to the user's particular computing device. FIGS. 22-23 illustrate examples of the user interfaces of FIGS. 9-21 for use on a smartphone. FIGS. 24-25 illustrate examples of the user interfaces of FIGS. 9-21 for use on a tablet. Not all of the examples of FIGS. 9-21 are shown, however, one of ordinary skill in the art would understand from FIGS. 22-25 that any of the user interfaces of FIGS. 9-21 could be displayed on a smartphone or tablet. Thus, the present disclosure also provides for improved interaction with the service application using devices such as a smartphone or tablet.

Computing Device

Figure 26:
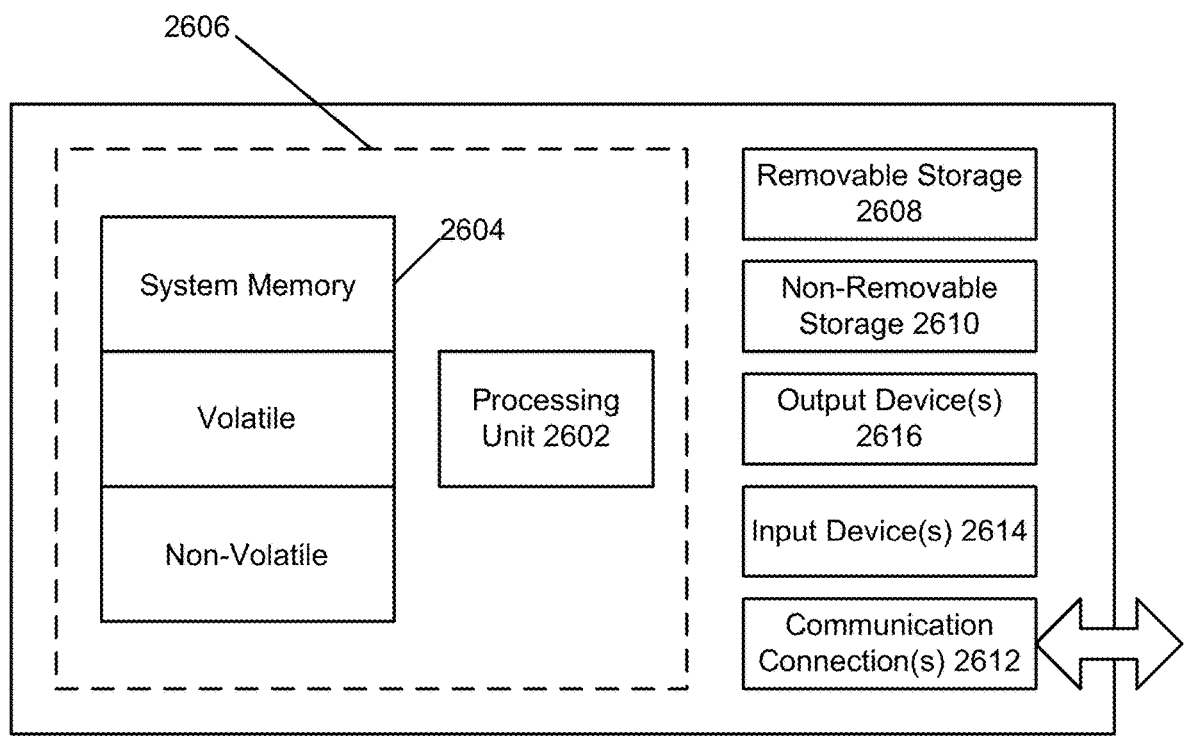
FIG. 26 illustrates and exemplary computing device.

FIG. 26 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well-known computing systems, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 26, an exemplary system for implementing aspects described herein includes a computing device, such as computing device 2600. In its most basic configuration, computing device 2600 typically includes at least one processing unit 2602 and memory 2604. Depending on the exact configuration and type of computing device, memory 2604 may be volatile (such as random access memory (RAM)), non-volatile (such as read-only memory (ROM), flash memory, etc.), or some combination of the two. This most basic configuration is illustrated in FIG. 26 by dashed line 2606.

Computing device 2600 may have additional features/functionality. For example, computing device 2600 may include additional storage (removable and/or non-removable) including, but not limited to, magnetic or optical disks or tape. Such additional storage is illustrated in FIG. 26 by removable storage 2608 and non-removable storage 2610.

Computing device 2600 typically includes a variety of tangible computer readable media. Computer readable media can be any available media that can be accessed by device 2600 and includes both volatile and non-volatile media, removable and non-removable media.

Computer storage media include tangible volatile and non-volatile, and removable and non-removable media implemented in any method or technology for storage of information such as computer readable instructions, data structures, program modules or other data. Memory 2604, removable storage 2608, and non-removable storage 2610 are all examples of computer storage media. Computer storage media include, but are not limited to tangible media such as RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 2600. Any such computer storage media may be part of computing device 2600.

Computing device 2600 may contain communications connection(s) 2612 that allow the device to communicate with other devices. Computing device 2600 may also have input device(s) 2614 such as a keyboard, mouse, pen, voice input device, touch input device, etc. Output device(s) 2616 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device.

One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for providing a multi-window architecture, comprising:

establishing a session between a service application and a client application;

displaying a parent window in the client application executing on a computing device, the parent window executing a first webclient having first message handlers;

displaying a child window in the client application, the child window executing a second webclient having second message handlers;

executing a binary proxy in the parent window that proxies communications between the child window and the service application;

creating a first session storage associated with the service application having a first private local data store associated with the session using key/value pairs;

creating a second session storage associated with the client application having a second private local data store associated with the session using the key/value pairs;

synchronizing session-specific data between the first private local data store and the second private local data store using the key/value pairs such that the session-specific data associated with the client application is accessible only by the service application and the client application; and communicating messages between the parent window and the child window in the client application using a message bus that is a local communication mechanism within the client application for messages between the parent window and the child window.

2. The method of claim 1, further comprising:

creating the messaging bus using a first interface at the first webclient and a second interface at the second webclient;

detecting at either the first interface or the second interface that the messages have been sent;

parsing a predetermined message from the messages;

determining if the predetermined message is in a lookup table; and if so, running an action based on content of the predetermined message.

3. The method of claim 2, wherein the messages communicated over the message bus contain information that does not involve the service application.

4. The method of claim 1, further comprising:

executing message handlers that communicate shared messages between the parent window and the child window; and communicated the shared messages with the service application, wherein the service application views the parent window and the child window as a single client application.

5. The method of claim 4, wherein the shared messages are communicated as binary data.

6. The method of claim 4, further comprising:

maintaining a view registry at the parent window that is used by the child window when child views are created and registered; and determining, using the view registry, if an update received at the parent application from the service application or a second child window needs to be communicated to a respective child view.

7. The method of claim 4, further comprising:

communicating commands from the child window to the service application via the parent window, wherein the commands request a change to the first session storage; and communicated an update from the first session storage at the service application to the child window via the parent window.

8. The method of claim 1, further comprising destroying the child window when the parent window is destroyed.

9. The method of claim 1, further comprising saving a layout of the parent window and the child window as displayed in a user interface.

10. The method of claim 1, further comprising representing the session by a Uniform Resource Identifier (URI).

11. The method of claim 1, further comprising synchronizing an application state between the parent window, the child window and the service application using a state model that includes information associated with the service application.

12. The method of claim 11, further comprising:

receiving an input in the child window that causes a change in the application state;

sending the change in the application state as a shared message to the parent window;

acting, at the parent window, on the change in application state; and proxying the change in application state from the parent window to the service application, wherein the service application acts on the change in application state.

13. The method of claim 11, further comprising:

adding a second client application to the session as a collaborator, the second client application having at least a second parent window;

synchronizing the application state between the parent window, the child window, the service application and the second parent window using a state model that includes information associated with the service application.

14. The method of claim 13, further comprising synchronizing data between the client application and the service application using the first private local data store and the second private local data store such that the data is not visible to the second client application.

15. A method for providing a private local data store to share information between a service application and a client application, comprising:

creating a first session storage associated with the service application;

creating a second session storage associated with the client application;

establishing a session between the service application and the client application;

creating a first private local data store in the first session storage associated with the session using key/value pairs;

creating a second private local data store in the second session storage associated with the session using the key/value pairs; and synchronizing session-specific data between the first private local data store and the second private local data store using a protocol over HTTP/HTTPS such that the session-specific data associated with the client application is accessible only by the service application and the client application.

16. The method of claim 15, further comprising:

executing JavaScript to create the first session storage and the second session storage; and providing the first session storage and the second session storage as in-memory data stores.

17. The method of claim 15, further comprising synchronizing data the first private local data store and the second private local data store in accordance with a session ID uniquely associated with the session.

18. The method of claim 17, further comprising:

collaborating with a second client application;

creating a third session storage associated with the second client application;

synchronizing the data between the first private local data store and the second private local data store using the key/value pairs such that the data is only accessible by the service application and the client application and is inaccessible by the second client application.

19. The method of claim 18, wherein the data is sensitive data to be protected from being accessed by the second client application.

20. The method of claim 15, further comprising:
establishing the session at the Uniform Resource Locator (URL) associated with the session; and
destroying the first private local data store and the second private local data store when the client application navigates away from the URL.

21. The method of claim 15, further comprising:
receiving, at the service application, a command from the client application to alter the data in the first private local data store; and
invoking a response at the service application; and
communicating the response back to the client application to be written in to the second private local data store.

22. The method of claim 15, further comprising writing the data into the first private local data store and the second private local data store as a string value.

23. The method of claim 15, further comprising maintaining a canonical value of the data at the first private local data store at the service application.

24. A method for providing a multi-window architecture, comprising:
providing a parent window in a client application executing on a computing device, the parent window executing a first webclient having first message handlers;
providing a child window in the client application, the child window executing a second webclient having second message handlers;
synchronizing session-specific data between a first private local data store at the service application and a second private local data store at the client application such that the session-specific data associated with the client application is accessible only by the service application and the client application; and
messaging data between the parent window and the child window in the client application using the first message handlers and the second message handlers,
wherein the first private local data store and the second private local data store are associated with the session, and
wherein data in the first private local data store and the second private local data store is only accessible by the service application and the client application.

25. The method of claim 24, further comprising:
establishing a session between a remote application service and the client application;
providing a binary proxy in the parent window that proxies communications between the child window and the service application; and
synchronizing application state between the parent window, the child window and the service application using a state model that includes application state information associated with the service application.

26. The method of claim 25, further comprising:
collaborating with at least one second client application; and
synchronizing the application state between the parent window, the child window, the service application, and at least one second parent window associated with the at least one second client application using the state model.

27. The method of claim 26, wherein the data in the first private local data store and the second private local data store is inaccessible to the at least one second client application.

28. The method of claim 24, further comprising presenting a view of the service application in the parent window and the child window.

29. The method of claim 28, further comprising:
unlinking the parent window and the child window;
presenting a first view of the service application in the parent window; and
presenting a second view of the service application in the child window.

30. The method of claim 24, further comprising presenting plural views of the service application in one of the parent window or the child window.

31. The method of claim 24, further comprising:
providing a menu that includes at least one drag-and-drop menu item; and
altering the view in accordance with the drag-and-drop menu item.

32. The method of claim 24, wherein the data comprises metadata associated with an image displayed by the service application, the method further comprising providing a control to toggle display of the metadata in the parent window or the child window.

33. A method for providing a multi-window architecture, comprising:
establishing a session between a service application and a client application;
displaying a parent window in the client application executing on a computing device, the parent window executing a first webclient having first message handlers;
displaying a child window in the client application, the child window executing a second webclient having second message handlers;
creating a first session storage associated with the service application having a first private local data store associated with the session using key/value pairs;
creating a second session storage associated with the client application having a second private local data store associated with the session using the key/value pairs;
synchronizing session-specific data between the first private local data store and the second private local data store such that the session-specific data associated with the client application is accessible only by the service application and the client application;
executing a binary proxy in the parent window that proxies communications between the child window and the service application;
maintaining a view registry at the parent window that is used by the child window when child views are created and registered; and
determining, using the view registry, if an update received at the parent application from the service application or a second child window needs to be communicated to a respective child view.

34. The method of claim 33, further comprising communicating messages between the parent window and the child window in the client application using a message bus that is a local communication mechanism within the client application for messages between the parent window and the child window.

35. The method of claim 33, wherein the first private local data store and a second private local data store are associated with the session.

36. The method of claim 33, further comprising:
communicating commands from the child window to the service application via the parent window, wherein the commands request a change to the first session storage; and communicated an update from the first session storage at the service application to the child window via the parent window.

37. The method of claim 33, further comprising synchronizing an application state between the parent window, the child window and the service application using a state model that includes information associated with the service application.

38. The method of claim 37, further comprising:
receiving an input in the child window that causes a change in the application state;
sending the change in the application state as a shared message to the parent window;
acting, at the parent window, on the change in application state; and
proxying the change in application state from the parent window to the service application, wherein the service application acts on the change in application state.

39. The method of claim 37, further comprising:
adding a second client application to the session as a collaborator, the second client application having at least a second parent window;
synchronizing the application state between the parent window, the child window, the service application and the second parent window using a state model that includes information associated with the service application.

* * * * *

UNITED STATES PATENT AND TRADEMARK OFFICE
CERTIFICATE OF CORRECTION

PATENT NO. : 10,846,107 B2  
APPLICATION NO. : 15/465293  
DATED : November 24, 2020  
INVENTOR(S) : Christopher James Jarabek et al.

Page 1 of 1

It is certified that error appears in the above-identified patent and that said Letters Patent is hereby corrected as shown below:

In the Claims

Column 19, Line 34, Claim 4, "communicated" should read --communicating--.

Column 19, Line 53, Claim 7, "communicated" should read --communicating--.

Signed and Sealed this  
Sixth Day of April, 2021

Drew Hirshfeld  
*Performing the Functions and Duties of the  
Under Secretary of Commerce for Intellectual Property and  
Director of the United States Patent and Trademark Office*